United States Patent
Bolbenes et al.

(10) Patent No.: US 11,972,264 B2
(45) Date of Patent: Apr. 30, 2024

(54) MICRO-OPERATION SUPPLY RATE VARIATION

(71) Applicant: Arm Limited, Cambridge (GB)

(72) Inventors: Guillaume Bolbenes, Vallauris (FR); Thibaut Elie Lanois, Peymeinade (FR); Houdhaifa Bouzguarrou, Valbonne (FR); Luca Nassi, Antibes (FR)

(73) Assignee: Arm Limited, Cambridge (GB)

( * ) Notice: Subject to any disclaimer, the term of this patent is extended or adjusted under 35 U.S.C. 154(b) by 18 days.

(21) Appl. No.: 17/838,713

(22) Filed: Jun. 13, 2022

(65) Prior Publication Data

US 2023/0409325 A1  Dec. 21, 2023

(51) Int. Cl.
*G06F 9/38* (2018.01)
*G06F 9/32* (2018.01)

(52) U.S. Cl.
CPC .......... *G06F 9/3806* (2013.01); *G06F 9/325* (2013.01)

(58) Field of Classification Search
CPC .... G06F 9/325; G06F 9/30065; G06F 9/3836; G06F 9/3806
See application file for complete search history.

(56) References Cited

U.S. PATENT DOCUMENTS

| | | | | |
|---|---|---|---|---|
| 9,836,304 B2* | 12/2017 | Denman | ............... | G06F 9/3844 |
| 11,507,380 B2* | 11/2022 | Clouqueur | ............ | G06F 9/3806 |
| 2009/0150657 A1* | 6/2009 | Gschwind | ............ | G06F 9/3804 |
| | | | | 712/E9.047 |
| 2010/0191993 A1* | 7/2010 | Chaudhry | ............. | G06F 9/3869 |
| | | | | 713/340 |
| 2014/0372736 A1* | 12/2014 | Greenhalgh | .......... | G06F 9/3869 |
| | | | | 712/239 |
| 2016/0098206 A1* | 4/2016 | Kishore | ................ | G06F 9/3004 |
| | | | | 711/162 |
| 2017/0083343 A1* | 3/2017 | Burger | ................ | G06F 9/30101 |

(Continued)

FOREIGN PATENT DOCUMENTS

EP  821305 A2 * 1/1998 ............. G06F 9/325

OTHER PUBLICATIONS

Alper Buyuktosunoglu, Tejas Karkhanis, David H. Albonesi, and Pradip Bose, "Energy Efficient Co-Adaptive Instruction Fetch and Issue", IEEE, (Year: 2003).*

(Continued)

*Primary Examiner* — Courtney P Carmichael-Moody
(74) *Attorney, Agent, or Firm* — NIXON & VANDERHYE P.C.

(57) ABSTRACT

Processing circuitry performs processing operations in response to micro-operations. Front end circuitry supplies the micro-operations to be processed by the processing circuitry. Prediction circuitry generates a prediction of a number of loop iterations for which one or more micro-operations per loop iteration are to be supplied by the front end circuitry, where an actual number of loop iterations to be processed by the processing circuitry is resolvable by the processing circuitry based on at least one operand corresponding to a first loop iteration to be processed by the processing circuitry. The front end circuitry varies, based on a level of confidence in the prediction of the number of loop iterations, a supply rate with which the one or more micro-operations for at least a subset of the loop iterations are supplied to the processing circuitry.

17 Claims, 14 Drawing Sheets

(56) References Cited

U.S. PATENT DOCUMENTS

2017/0249149 A1* 8/2017 Priyadarshi ............ G06F 9/3836
2020/0050458 A1* 2/2020 Bouzguarrou ...... G06F 9/30065
2020/0065105 A1* 2/2020 Bouzguarrou ...... G06F 11/3476
2021/0019150 A1* 1/2021 Schinzler ............ G06F 9/30058

OTHER PUBLICATIONS

Amirali Baniasadi and Andreas Moshovos, "Instruction Flow-Based Front-end Throttling for Power-Aware High-Performance Processors", IEEE, pp. 16-21 (Year: 2002).*
Arm document, "CPYP, CPYM, CPYE", 2021, 8 pp.

* cited by examiner

FIG. 10

| | Mispredict case | | | | | | | | | | | |
|---|---|---|---|---|---|---|---|---|---|---|---|---|
| | P0 | F0 | F1 | F2 | DEC1 | REN | DISP | I0 | I1 | I2 | E1 | E2=P0 |
| 0 | Iter0 | | | | | | | | | | | predicted length=5 |
| 1 | Iter1 | Iter0 | | | | | | | | | | |
| 2 | Iter2 | Iter1 | Iter0 | | | | | | | | | |
| 3 | Iter3 | Iter2 | Iter1 | Iter0 | | | | | | | | |
| 4 | Iter4 | Iter3 | Iter2 | Iter1 | Iter0 | | | | | | | |
| 5 | A | Iter4 | Iter3 | Iter2 | Iter1 | Iter0 | | | | | | |
| 6 | B | A | Iter4 | Iter3 | Iter2 | Iter1 | Iter0 | | | | | |
| 7 | C | B | A | Iter4 | Iter3 | Iter2 | Iter1 | Iter0 | | | | |
| 8 | D | C | B | A | Iter4 | Iter3 | Iter2 | Iter1 | Iter0 | | | |
| 9 | E | D | C | B | A | Iter4 | Iter3 | Iter2 | Iter1 | Iter0 | | |
| 10 | F | E | D | C | B | A | Iter4 | Iter3 | Iter2 | Iter1 | Iter0 | |
| 11 | G | F | E | D | C | B | A | Iter4 | Iter3 | Iter2 | Iter1 | Iter0 resolve=6 |
| 12 | | G | F | E | D | C | B | A | Iter4 | Iter3 | Iter2 | Iter1 |
| 13 | | | G | F | E | D | C | B | A | Iter4 | Iter3 | Iter2 |
| 14 | | | | G | F | E | D | C | B | A | Iter4 | Iter3 |
| 15 | Iter5 | | | | | | | | | | Iter4 | mispred |
| 16 | A | Iter5 | | | | | | | | | | flushed |
| 17 | B | A | Iter5 | | | | | | | | | flushed |
| 18 | C | B | A | Iter5 | | | | | | | | flushed |
| 19 | D | | B | A | Iter5 | | | | | | | flushed |
| 20 | E | | | B | A | Iter5 | | | | | | flushed |
| 21 | F | | | | B | A | Iter5 | | | | | flushed |
| 22 | G | | | | | B | A | Iter5 | | | | flushed |
| 23 | | | | | | | B | A | Iter5 | | | flushed |
| 24 | | | | | | | | B | A | Iter5 | | flushed |
| 25 | | | | | | | | | B | A | Iter5 | flushed |
| 26 | | | | | | | | | | B | A | Iter5 |
| 27 | | | | | | | | | | | B | A |
| 28 | | | | | | | | | | | | B |

| | confidence heuristic on predicted length from P0 | | | | | | | | | | | |
|---|---|---|---|---|---|---|---|---|---|---|---|---|
| | P0 | F0 | F1 | F2 | DEC1 | REN | DISP | I0 | I1 | I2 | E1 | E2=P0 |
| 0 | Iter0 | | | | | | | | | | | predicted length=5 |
| 1 | Iter1 | Iter0 | | | | | | | | | | |
| 2 | Iter2 | Iter1 | Iter0 | | | | | | | | | |
| 3 | Iter3 | Iter2 | Iter1 | Iter0 | | | | | | | | |
| 4 | | Iter3 | Iter2 | Iter1 | Iter0 | | | | | | | |
| 5 | | | Iter3 | Iter2 | Iter1 | Iter0 | | | | | | |
| 6 | | | | Iter3 | Iter2 | Iter1 | Iter0 | | | | | |
| 7 | | | | | Iter3 | Iter2 | Iter1 | Iter0 | | | | |
| 8 | | | | | | Iter3 | Iter2 | Iter1 | Iter0 | | | |
| 9 | | | | | | | Iter3 | Iter2 | Iter1 | Iter0 | | |
| 10 | | | | | | | | Iter3 | Iter2 | Iter1 | Iter0 | |
| 11 | Iter4 | | | | | | | Iter3 | Iter2 | Iter1 | Iter0 | resolve=6 |
| 12 | Iter5 | Iter4 | | | | | | | Iter3 | Iter2 | Iter1 | |
| 13 | A | Iter5 | Iter4 | | | | | | | Iter3 | Iter2 | |
| 14 | B | A | Iter5 | Iter4 | | | | | | | Iter3 | |
| 15 | | B | A | Iter5 | Iter4 | | | | | | | |
| 16 | | | B | A | Iter5 | Iter4 | | | | | | |
| 17 | | | | B | A | Iter5 | Iter4 | | | | | |
| 18 | | | | | B | A | Iter5 | Iter4 | | | | |
| 19 | | | | | | B | A | Iter5 | Iter4 | | | |
| 20 | | | | | | | B | A | Iter5 | Iter4 | | |
| 21 | | | | | | | | B | A | Iter5 | Iter4 | |
| 22 | | | | | | | | | B | A | Iter5 | Iter4 |
| 23 | | | | | | | | | | B | A | Iter5 |
| 24 | | | | | | | | | | | B | A |
| 25 | | | | | | | | | | | | B |

FIG. 11 confidence heuristic on predicted length from P0

|   | P0 | F0 | F1 | F2 | DEC1 | REN | DISP | I0 | I1 | I2 | E1 | E2=P0 |
|---|----|----|----|----|------|-----|------|----|----|----|----|-------|
| 0 | Iter0 |  |  |  |  |  |  |  |  |  |  | predicted length=5 |
| 1 | Iter1 | Iter0 |  |  |  |  |  |  |  |  |  |  |
| 2 | Iter2 | Iter1 | Iter0 |  |  |  |  |  |  |  |  |  |
| 3 | Iter3 | Iter2 | Iter1 | Iter0 |  |  |  |  |  |  |  |  |
| 4 |  | Iter3 | Iter2 | Iter1 | Iter0 |  |  |  |  |  |  |  |
| 5 |  |  | Iter3 | Iter2 | Iter1 | Iter0 |  |  |  |  |  |  |
| 6 | Iter4 |  |  | Iter3 | Iter2 | Iter1 | Iter0 |  |  |  |  |  |
| 7 |  | Iter4 |  |  | Iter3 | Iter2 | Iter1 | Iter0 |  |  |  |  |
| 8 |  |  | Iter4 |  |  | Iter3 | Iter2 | Iter1 | Iter0 |  |  |  |
| 9 | Iter5 |  |  | Iter4 |  |  | Iter3 | Iter2 | Iter1 | Iter0 |  |  |
| 10 |  | Iter5 |  |  | Iter4 |  |  | Iter3 | Iter2 | Iter1 | Iter0 |  |
| 11 | A |  | Iter5 |  |  | Iter4 |  |  | Iter3 | Iter2 | Iter1 | Iter0 resolve=6 |
| 12 | B | A |  | Iter5 |  |  | Iter4 |  |  | Iter3 | Iter2 | Iter1 |
| 13 |  | B | A |  | Iter5 |  |  | Iter4 |  |  | Iter3 | Iter2 |
| 14 |  |  | B | A |  | Iter5 |  |  | Iter4 |  |  | Iter3 |
| 15 |  |  |  | B | A |  | Iter5 |  |  | Iter4 |  |  |
| 16 |  |  |  |  | B | A |  | Iter5 |  |  | Iter4 |  |
| 17 |  |  |  |  |  | B | A |  | Iter5 |  |  | Iter4 |
| 18 |  |  |  |  |  |  | B | A |  | Iter5 |  |  |
| 19 |  |  |  |  |  |  |  | B | A |  | Iter5 |  |
| 20 |  |  |  |  |  |  |  |  | B | A |  | Iter5 |
| 21 |  |  |  |  |  |  |  |  |  | B | A |  |
| 22 |  |  |  |  |  |  |  |  |  |  | B | A |
| 23 |  |  |  |  |  |  |  |  |  |  |  | B |

FIG. 12

MICRO-OPERATION SUPPLY RATE VARIATION

BACKGROUND

Technical Field

The present technique relates to the field of data processing.

Technical Background

An apparatus may have processing circuitry to perform processing operations in response to micro-operations, and front end circuitry to supply the micro-operations to be processed by the processing circuitry. Prediction circuitry may predict which micro-operations are required to be supplied to the processing circuitry. If the prediction is correct, performance can be improved by reducing the delay that would be incurred if the actual micro-operations required to be processed were identified before supplying any of the micro-operations from the front end circuitry. However, if a misprediction causes supply of incorrect micro-operations which would give the wrong architectural result if processed, a flush of micro-operations may be performed and the correct micro-operations may be re-supplied after the flush.

SUMMARY

At least some examples of the present technique provide an apparatus comprising:
processing circuitry to perform processing operations in response to micro-operations;
front end circuitry to supply the micro-operations to be processed by the processing circuitry; and
prediction circuitry to generate a prediction of a number of loop iterations for which one or more micro-operations per loop iteration are to be supplied by the front end circuitry, where an actual number of loop iterations to be processed by the processing circuitry is resolvable by the processing circuitry based on at least one operand corresponding to a first loop iteration to be processed by the processing circuitry; in which:
the front end circuitry is configured to vary, based on a level of confidence in the prediction of the number of loop iterations, a supply rate with which the one or more micro-operations for at least a subset of the loop iterations are supplied to the processing circuitry.

At least some examples of the present technique provide a method comprising:
supplying, with front end circuitry, micro-operations to be processed by processing circuitry; and
performing, with the processing circuitry, processing operations in response to the micro-operations;
generating a prediction of a number of loop iterations for which one or more micro-operations per loop iteration are to be supplied by the front end circuitry, where an actual number of loop iterations to be processed by the processing circuitry is resolvable by the processing circuitry based on at least one operand corresponding to a first loop iteration to be processed by the processing circuitry; and
varying, based on a level of confidence in the prediction of the number of loop iterations, a supply rate with which the one or more micro-operations for at least a subset of the loop iterations are supplied to the processing circuitry by the front end circuitry.

At least some examples of the present technique provide a non-transitory computer-readable medium to store computer-readable code for fabrication of an apparatus comprising:
processing circuitry to perform processing operations in response to micro-operations;
front end circuitry to supply the micro-operations to be processed by the processing circuitry; and
prediction circuitry to generate a prediction of a number of loop iterations for which one or more micro-operations per loop iteration are to be supplied by the front end circuitry, where an actual number of loop iterations to be processed by the processing circuitry is resolvable by the processing circuitry based on at least one operand corresponding to a first loop iteration to be processed by the processing circuitry; in which:
the front end circuitry is configured to vary, based on a level of confidence in the prediction of the number of loop iterations, a supply rate with which the one or more micro-operations for at least a subset of the loop iterations are supplied to the processing circuitry.

Further aspects, features and advantages of the present technique will be apparent from the following description of examples, which is to be read in conjunction with the accompanying drawings.

BRIEF DESCRIPTION OF THE DRAWINGS

FIGS. 10 to 12 illustrate examples of pipeline timing diagrams illustrating how slowing down supply of micro-operations following a prediction of the number of loop iterations can improve performance in some scenarios;

DESCRIPTION OF EXAMPLES

Figure 1:
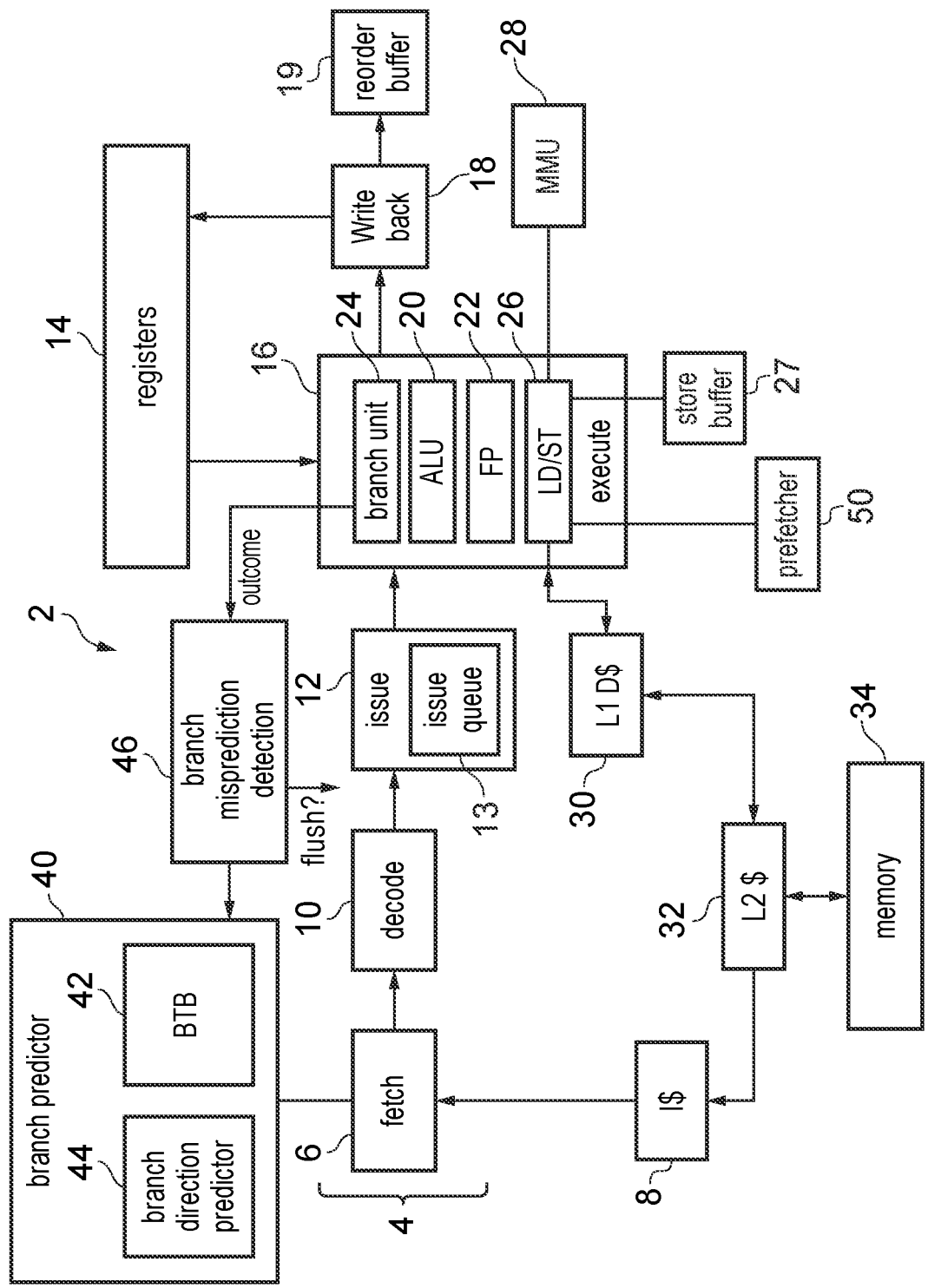
FIG. 1 schematically illustrates an example of a data processing apparatus.

Prediction circuitry may be provided to provide a prediction of which micro-operations are to be supplied by front-end circuitry for processing by processing circuitry. One scenario which the prediction circuitry may try to predict is how many loop iterations are going to be required for a loop where each iteration requires one or more micro-operations to be supplied to the processing circuitry. How many iterations are actually required may depend on operands which may not be available until the micro-operations reach an execute stage of the processing circuitry, but if the front-end circuitry waited until the actual number of iterations was known before supplying those iterations, there may be a loss of performance due to pipeline bubbles (cycles in which the processing circuitry has no micro-operation to process). Therefore, it can be useful to predict in advance how many loop iterations are required, and for the front-end circuitry to supply the micro-operations based on the prediction made by the prediction circuitry.

For some types of program loop, the determination of whether the loop should terminate or continue for a further iteration may depend on the operands of the latest iteration and so it may not be possible to determine when the first loop iteration is processed how many further loop iterations are required.

However, for other loops (such as those in the examples discussed in more detail below), the processing circuitry can resolve the actual number of loop iterations to be processed based on at least one operand corresponding to a first loop iteration to be processed by the processing circuitry. In this case, once the first loop iteration is processed then it may be known whether the prediction made by the prediction circuitry is correct and so any mispredictions can be resolved without waiting for all the previously supplied micro-operations to execute. For example, on an under-prediction of the number of loop iterations, some of the micro-operations to be processed after the loop may already have been supplied incorrectly and so may be flushed to allow micro-operations for further loop iterations of the loop to be supplied instead. However, such a flush operation may incur a cost in terms of performance as it may cause a number of cycles when the processing circuitry has no micro-operations ready to process.

The prediction circuitry may maintain information indicating a level of confidence associated with predictions of the number of loop iterations. Some predictions may be made more confidently than others. For example, confidence may be increased in response to a correct prediction and decreased in response to an incorrect prediction, or could be maintained based on observing past instances of the loop and evaluating whether the number of iterations remains stable or varies significantly for the loop from one instance to another.

In the examples below, the front end circuitry varies, based on a level of confidence in the prediction of the number of loop iterations, a supply rate with which the one or more micro-operations for at least a subset of the loop iterations are supplied to the processing circuitry. This may be seen as counterintuitive because normally one would assume that it is desirable to be able to supply micro-operations at the maximum supply rate possible, to fill up the processing pipeline with as many operations as possible and reduce the number of pipeline bubbles.

However, the inventors recognised that sometimes, e.g. for less confident predictions, it can actually be beneficial to reduce the supply rate with which the micro-operations are supplied to the processing circuitry for at least a subset of the loop iterations predicted as being required for the loop. This is because the performance penalty associated with an under-prediction of the number of loop iterations can be costly, because if the next micro-operations after the loop have already been supplied by the time it is detected that micro-operations for an insufficient number of loop iterations were supplied, a flush may be performed which results in the processing circuitry being unable to perform useful work for a number of processing cycles. By reducing the supply rate with which the one or more micro-operations are supplied for processing, this reduces the number of loop iterations which will already have been supplied at the point when the first loop iteration reaches the stage of the processing circuitry at which the actual number of loop iterations is resolved. This makes it less likely that the subsequent micro-operations after the loop will already have been supplied at the point when the under-prediction is identified. If the subsequent micro-operations have not yet been supplied then even if an under-prediction has been identified, the micro-operations for any further loop iterations required beyond those predicted initially can be supplied without requiring any subsequent micro-operations from the portion of program flow after the loop to be flushed. Hence, counterintuitively, reducing the supply rate can help to improve performance in some scenarios. However, if the supply rate was reduced for all instances of the loop, then this may harm performance for cases when the number of iterations can be predicted more confidently. Therefore, it can be useful to vary the supply rate based on a level of confidence associated with the prediction of the number of loop iterations.

For supplying the one or more micro-operations for at least the subset of the loop iterations, the front end circuitry may select a lower supply rate for a less-confident prediction of the number of loop iterations than for a more-confident prediction of the number of loop iterations. Hence, for the more-confident predictions, the probability of a misprediction is lower and so on average performance can be improved by using a faster supply rate. However, for the less-confident predictions, the probability of a misprediction requiring a flush is higher and so average performance can be improved by reducing the supply rate. Overall, this variation of supply rate with confidence in the prediction can help to improve the average performance achieved per instance of the number of iterations of the loop being predicted.

In some examples, the front-end circuitry may support two different supply rates which can be selected based on the level of confidence in the prediction: a faster supply rate used for the more-confident predictions and a slower supply rate used for the less-confident predictions.

However, other examples may support at least three different supply rates which are selectable based on the level of confidence in the prediction of the number of loop iterations. Hence, for supplying the one or more micro-operations for at least the subset of the loop iterations, the front end circuitry is configured to select between at least three different supply rates based on the level of confidence. Supporting at least three different supply rates can help to allow a gradual scaling of the supply rate with successive levels of confidence, which can help to support a further performance improvement by improving the balance between performance gains achievable in using a faster supply rate when no under-prediction occurs versus the risk of performance losses caused by a flush on occasions when an under-prediction occurs which requires flushing of at least one subsequent micro-operation from a portion of program flow after the loop.

In some examples, each of the supply rates supported by the front end circuitry may be a non-zero supply rate. In that case, regardless of the supply rate selected based on the level of confidence, further loop iterations may be supplied in at least some cycles. The lower supply rates may be implemented by leaving at least one empty pipeline bubble between cycles in which a micro-operation for a loop iteration is supplied for processing.

Other examples may support, as one of the different supply rates available for selection based on the level of confidence, a zero supply rate in which no further loop iterations are supplied for processing while using the zero supply rate. For example, the zero supply rate could be maintained until the actual number of loop iterations is resolved by the processing circuitry. Halting supply of further loop iterations altogether can be useful for the least confident predictions where the risk of an under-prediction occurring and requiring a flush may be high.

In some examples, the variable supply rate selected based on the level of confidence in the prediction of the number of loop iterations may be applied during the supply of all the loop iterations for which micro-operations are supplied by the front-end circuitry for a given loop.

However, in other examples, the variable supply rate may be applied once a certain initial subset of loop iterations have had their micro-operations supplied already, so that the variation in supply rate applies to further loop iterations supplied after that initial subset has already been completed. The initial subset of loop iterations could be supplied at a rate which is independent of the level of confidence in the prediction.

Hence, for a prediction where the level of confidence meets a supply rate reduction criterion, the front end circuitry may supply the one or more micro-operations for an initial subset of loop iterations at a first supply rate; and supply the one or more micro-operations for a further subset of loop iterations at a second supply rate lower than the first supply rate. This approach can be useful because, for the initial subset of loop iterations, the probability of the loop terminating within that initial subset of loop iterations may be lower than for later loop iterations, and so reducing the supply rate for those initial subset of loop iterations for less confident predictions may harm performance on average. Average case performance may be improved by supplying the initial subset of loop iterations that a rate which does not vary based on level of confidence (e.g. at the maximum supply rate supported by the front-end circuitry), but then varying the supply rate for the further loop iterations based on the level of confidence which helps to improve performance for the reasons given above.

The number of iterations in the initial subset of loop iterations can be independent of the level of confidence in the prediction determined by the prediction circuitry.

For predictions which do not meet the supply rate reduction criterion (e.g. when the level of confidence is greater than a certain threshold), the micro-operations for the predicted number of loop iterations can be supplied at the first supply rate and there is no need to switch to a lower supply rate.

For a prediction where the level of confidence meets the supply rate reduction criterion, different approaches are possible for determining when to end the initial subset of loop iterations supplied at the first supply rate, and then use the lower second supply rate to supply one or more further loop iterations.

In one example, the number of loop iterations within the initial subset of loop iterations may depend on the prediction made by the prediction circuitry.

For example, for some loops, the one or more micro-operations may comprise one or more predicated micro-operations for which, if at least one unnecessary iteration of the one or more micro-operations is processed by the processing circuitry following an over-prediction of the number of loop iterations, processing of the at least one unnecessary iteration is predicated to suppress any architectural effect of the unnecessary iteration of the one or more micro-operations. For such predicated micro-operations, there is no need to flush the pipeline of the predicated micro-operations if there is an over-prediction of the number of loop iterations, because processing the predicated micro-operation still gives the correct architectural result. Therefore, it is possible to continue supplying further loop iterations beyond the number of loop iterations predicted by the prediction circuitry, to avoid supplying the subsequent micro-operations to be processed after the loop terminates until the actual number of loop iterations has been resolved by the processing circuitry. However, if these further loop iterations were supplied at the maximum rate supported, this may unnecessarily consume power in processing further loop iterations which are predicted not to be required, so it can be useful to vary, for the less confident predictions, the rate at which these further loop iterations are supplied, to use a reduced second supply rate for those further loop iterations so as to reduce dynamic power consumption by having some empty cycles in which no processing is required. For more confident predictions (not meeting the supply rate reduction criterion), this supply of micro-operations for loop iterations predicted to be unnecessary may not be beneficial and it may be preferred simply to switch to the subsequent micro-operations after the loop after the predicted number of loop iterations have been supplied, as the likelihood of a flush being required may be lower than for less-confident predictions.

Hence, in some examples, where the micro-operations to be supplied are predicated micro-operations, the initial subset of loop iterations comprises the number of loop iterations predicted by the prediction circuitry; and the further subset of loop iterations comprises at least one further loop iteration supplied to the processing circuitry at the second supply rate despite being predicted not to be required for processing by the processing circuitry. Hence, the initial subset of loop iterations ends when the loop is predicted to be terminated, but at least one further loop iteration is supplied at the slower rate despite being predicted not to be required, to avoid needing a flush if the predicted number of loop iterations was too low.

In another example, the initial subset of loop iterations may comprise a baseline number of loop iterations which is independent of the number of loop iterations predicted by the prediction circuitry to be required for processing by the processing circuitry. For example, the baseline number of loop iterations may correspond to a minimum number of loop iterations predicted to be required. The baseline number may be selected such that a probability of the actual number of loop iterations being less than the baseline number of loop iterations may be very low. With this implementation, the switch from the first supply rate the second supply rate may occur before all of the predicted number of loop iterations have been supplied. This approach can be useful either in the case of predicated loop where the predicated micro-operations discussed above are used, or in implementations where the micro-operations of the loop are not predicated micro-operations and so would cause an incorrect architectural effect if processed. By using a faster rate for the initial baseline number of loop iterations where the probability of an under-prediction is low, but then switching to a slower supply rate when the level of confidence meets the supply rate reduction criterion, and using that slower supply rate for further loop iterations until either the predicted number of loop iterations have been supplied or the actual number of loop iterations has been resolved by the processing circuitry, this can provide improved performance by reducing the probability of a flush being performed.

In some examples, the baseline number of loop iterations may be a fixed number. For example, the baseline number may be hardwired in the prediction circuitry and may not be variable. The baseline number could be chosen at a design stage, e.g. based on analysis of typical processing workloads and the minimum number of loop iterations expected.

In other examples, the prediction circuitry may determine the baseline number of loop iterations based on a lookup of a baseline-iteration number-defining parameter of a prediction data structure, where the baseline-iteration-number-defining parameter is separate from a prediction parameter used to determine the number of loop iterations predicted by the prediction circuitry to be required for processing by the processing circuitry. This may recognise that loops at different points in program flow of a program being executed may encounter different ranges of variability in the numbers of loop iterations seen on different instances of executing each loop, so a loop at one part of the program flow may encounter a different minimum number of loop iterations compared to a loop at a different point in the program flow. Hence, in some examples, the prediction circuitry may track the range of numbers of loop iterations seen for different loops being predicted, and maintain a baseline-iteration-number-defining parameter based on that tracking. E.g. based on the minimum number of iterations seen for a given loop. The baseline-iteration-number-defining parameter can be used to control the point at which the supply rate is switched from the first supply rate to the second supply rate. This can help to improve performance by allowing a faster supply rate for lower confidence predictions until the minimum number of iterations seen previously for the predicted loop has been supplied.

In response to a determination that, after the front end circuitry has determined to supply the one or more micro-operations for the subset of the loop iterations at a lower supply rate, the processing circuitry has resolved the actual number of loop iterations and there is still at least one remaining iteration for which the one or more micro-operations are not yet obtained or generated for supply to the processing circuitry, the front end circuitry may supply the one or more micro-operations for the at least one remaining iteration at a higher supply rate than the lower supply rate. Hence, the supply can return to the faster rate supported once the correct number of iterations has been resolved and so it is known that no flush is required.

In some implementations, the processing circuitry may execute micro-operations for the loop iterations in-order.

That is, the loop iterations may be executed in the supply order in which they are supplied by the front end circuitry. Hence, the processing circuitry may be incapable of executing the micro-operations for the loop iterations out-of-order. For example, where the loop is explicitly identified in the machine code generated by a compiler for supply to the front-end circuitry, the loop iterations could be executed in program order. For other examples, the loop may be an implicit loop, for example being generated by the front end circuitry in response to a single machine code instruction which requires processing of a variable amount of data, and the micro-operations for the loop iterations may be generated in ascending or descending order of addresses of the portions of data processed on respective iterations of the loop. Either way, the hardware for the processing circuitry may be simplest to implement by restricting execution of the loop iterations to the order in which they are supplied by the front-end circuitry.

It will be appreciated that, even if the processing circuitry is restricted to executing micro-operations for the loop iterations in-order, this does not mean that the processing circuitry has to perform in-order processing of other types of micro-operations. Some implementations may support out-of-order execution of other types of micro-operations, but the out-of-order execution may not be available when the micro-operations are the type of micro-operations generated in response to the loop. This may be useful for more complex looping instructions where a single instruction in machine code is decoded into multiple iterations of micro-operations, such as the type that processes a variable number of bytes of data as described further below.

For other examples, the processing circuitry may be capable of executing the loop iterations out-of-order. This can help to improve performance because if one loop iteration is stalled (e.g. because of waiting for data to be returned from memory or a page table translation to become available), a subsequent loop iteration, which is later in the order in which the loop iterations were supplied by the front-end circuitry, can be executed in the meantime.

For an example where the processing circuitry is capable of out-of-order execution of the loop iterations, it can be useful for the supply rate for the loop micro-operations to also vary based on resource utilisation information indicative of utilisation of back-end processing resource associated with the processing circuitry (in addition to varying based on confidence in the prediction as described earlier). If there is insufficient back-end processing resource available to process further loop micro-operations then dispatching the micro-operations at a faster rate may not give any performance benefit as they cannot be processed anyway, and dispatching micro-operations faster may increase the risk that too many iterations of micro-operations are supplied, which increases the risk of a flush (either in an example where non-predicated micro-operations are supplied for the loop, or for a predicated example increases the risk of flush in the case of an under-prediction of the number of loop iterations), and even in an example which could tolerate processing too many iterations of micro-operations because of predication and an over-prediction of the number of loop iterations is made, supplying too many iterations of micro-operations incurs some increased power consumption. Hence, it can be useful to reduce the supply rate for the loop micro-operations if the amount of spare back-end processing resource is lower than a threshold, as the constrained back-end resource means the risk-benefit analysis in terms of supply rate control swings towards reducing the supply rate.

The back-end processing resource, for which the utilisation is indicated by the resource utilisation information, could comprise one or more types of processing resource that can be used by the processing circuitry when processing the micro-operations of the loop. For example, the back-end processing resource could comprise at least one of: a store buffer to buffer pending store requests; prefetch circuitry to prefetch data to a cache; an issue queue to queue micro-operations supplied by the front end circuitry before the micro-operations are issued to the processing circuitry; and a reorder buffer to track in-order commitment of out-of-order executed instructions.

For an example where the processing circuitry supports in-order execution of the loop iterations but cannot execute the loop iterations out of order, it is not as helpful to consider resource utilisation information indicating utilisation of back-end processing resource, because even if there is a lot of spare back-end processing resource, dispatching micro-operations to the processing circuitry faster would not help to improve performance because if a given iteration is stalled due to a slow memory operation, it is still not possible to execute micro-operations for subsequent iterations until the earlier iteration has been executed. Hence, for in-order execution of loop iterations, it may be preferable to set the supply rate for the micro-operations of the loop independent of resource utilisation information indicating utilisation of back-end processing resource.

The prediction circuitry may generate the prediction of the number of loop iterations in response to detecting program flow reaching, or being predicted to reach, an address predicted as corresponding to a loop-terminating branch instruction for controlling, based on whether a loop termination condition is satisfied, whether the processing circuitry should process a further iteration of a loop body or process a following instruction to be processed after a final iteration of the loop body.

The technique described above can be particularly useful where the loop body associated with the loop-terminating branch instruction comprises operations to:
  determine a variable number of bytes to be processed in a current iteration;
  perform at least one processing operation based on the variable number of bytes determined for the current iteration, the at least one processing operation including at least one of a load operation and a store operation; and
  update, based on the variable number of bytes, a remaining bytes parameter indicative of a remaining number of bytes to be processed.

The number of iterations for such a loop body can be particularly hard to predict because the variable number of bytes to be processed in the loop as a whole may depend on at least one operand of the first iteration of the loop, which may be extremely variable for different instances of executing the same loop because it can be common for a function comprising such a loop body to be called from a number of different locations in program flow, where each instance may use different input operands. Hence, a reasonable number of mispredictions may be expected to arise for such a loop which processes a variable number of bytes of data loaded/stored from/to memory. The variation of the supply rate based on prediction confidence as discussed above can therefore help to reduce the probability of a flush being needed, and so improve performance for such loops.

For such a loop body involving the processing of a variable number of bytes, the loop termination condition for a given iteration of the loop-terminating branch instruction may be considered satisfied when the remaining bytes parameter indicates that the number of remaining bytes to be processed is zero. However, as mentioned above, whether the loop termination condition is satisfied for any remaining iteration of the loop may be resolved based on the operands of the first loop iteration. Therefore, it is not necessary to actually wait for a subsequent loop iteration to reach the processing stage before determining whether the loop termination condition will be satisfied for that loop iteration. The point at which the loop terminates can be resolved when the first loop iteration is processed.

For some loop bodies of the type that processes a variable amount of data as discussed above, the variable number of bytes to be processed in the current iteration is dependent on alignment of a target address of the load and/or store operation with respect to an alignment boundary. Loops of this type, which step through processing a block of data chunk by chunk in a number of iterations, can be much less efficient if each iteration of the loop starts processing data from an unaligned address (an address not aligned to a multiple of a natural transfer size supported by the memory system). This is because the memory system may split an unaligned memory access into multiple accesses performed separately to portions of data either side of the address at the alignment boundary. Therefore, if the initial operands for the first iteration the loop are unaligned, it can be useful to insert an additional partial loop iteration which does not process the maximum amount of data supported per loop iteration, but processes a smaller amount allowing the next iteration to start at an aligned address which is aligned to the alignment boundary. This means that the total number of iterations required may depend on the alignment of the input address, which is not typically known until relatively late in the processing pipeline, making it harder for the prediction circuitry to predict the required number of iterations. For this type of loop, the techniques discussed above can be particularly useful.

In some examples, the loop-terminating branch instruction is a combined instruction for controlling the processing circuitry to perform both the loop body and a conditional branch operation conditional on whether the loop termination condition is satisfied. Hence, in response to a single instruction, the front end circuitry identifies the one or more micro-operations required to implement the loop body as well as controlling any branching back to the same instruction to implement a further iteration of the loop.

For other examples, the loop-terminating branch instruction may be separate from one or more instructions for controlling the processing circuitry to perform the loop body. In this case, the compiler may generate machine code which has one or more functional instructions to perform the loop body itself and a branch instruction (which may either precede or follow the loop body) to evaluate the loop termination condition and determine whether to continue processing a further iteration of the loop (if the branch precedes the loop body, there may be a further unconditional branch at the end of the loop body to branch back to the loop terminating branch or other instruction marking the start of the loop).

Regardless of whether the loop-terminating branch instruction is combined with the loop body or separate, the prediction circuitry may train, based on observation of past instructions executed by the processing circuitry, which addresses in the program flow correspond to a loop-terminating branch instruction, and may learn the number of loop iterations associated with particular instances of that instruction. Based on prediction confidence, the prediction circuitry can vary the supply rate used for the micro-operations supplied to implement the iterations of the loop body.

The techniques discussed above can be particularly useful in loops which implement certain string processing library functions defined in the string.h header file of the C programming language. String.h is a library which provides a certain group of functions for manipulating strings stored in memory, where a string is a sequence of text characters. These functions can include memcpy (a function to copy a string from one region of memory to another), memcmp (a function to compare two strings), strchr (a function to search for the first occurrence of a specified character within a given string loaded from memory), strlen (a function to determine the length of a specified string variable, e.g. by searching for the first byte equal to 0 after a particular address in memory), and so on. Such functions can seem apparently simple to the software developer, but can be relatively performance intensive when compiled into the machine code which will actually be executed by the processor. In the compiled code, these functions may be implemented by using a loop body processing a variable number of bytes per iteration (e.g. dependent on a size specified for the loop as a whole and/or on address alignment), similar to the one discussed above. In some software applications, a relatively large fraction of processing time can be taken up by such string processing functions. As each instance of calling the string.h processing function may lead to multiple iterations of the loop body being performed and each iteration of the loop body may be associated with a loop-terminating branch instruction, and the same processing function may be called from many different locations in the program with different operands depending on the other operations performed before the function call, such software applications may be extremely prone to loss of performance caused by mispredictions of the number of iterations of micro-operations required to be processed by the processing circuitry. The techniques discussed above can help reduce the frequency with which flushes are needed for such loops. Hence, it can be particularly useful for the predicated loop body to comprises operations to implement a string.h C library function.

One particular example of a string.h library function for which this technique can be particularly useful is the memcpy function, which copies a variable number of bytes of data from first memory region to a second memory region. Memcpy operations are very common in some software applications, and can be slow to process as they can involve iteration of load operations to load bytes of data from memory and dependent store operations to store the loaded bytes to a different region of memory. The loop executed for the memcpy operation can be a relatively tight loop for which the penalty caused by load/store delays and branch mispredictions can be high. By using the techniques discussed above, average case performance can be improved for the memcpy operations, which can be expected to provide a reasonable performance benefit given the frequency of such operations in typical workloads. Hence, it can be particularly useful to use the techniques described above when the one or more micro-operations supplied for each loop iteration comprise micro-operations to control the processing circuitry to perform a memory copy operation to copy data from a first memory region to a second memory region.

Example Processing Apparatus

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; an issue stage 12 for queueing micro-operations in an issue queue 13 and checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example, in an out-of-order processor a register renaming stage could be included, e.g. between the decode stage 10 and issue stage 12, for mapping architectural registers specified by program instructions or micro-operations to physical register specifiers identifying physical registers in the register file 14. Also, for an out-of-order processor, the writeback stage 18 may use a reorder buffer 19 to track completion of instructions executed out-of-order.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. Pending store operations for which issuing of store requests to the memory system is awaited may be tracked in a store buffer 27. A memory management unit (MMU) 28 is provided to perform memory management operations such as address translation and checking of memory access permissions. The address translation mappings and access permissions may be defined in page table structures stored in the memory system. Information from the page table structures can be cached in a translation lookaside buffer (TLB) provided in the MMU 28.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness. The fetch stage 6 and decode stage 10 may be considered as an example of front end circuitry for supplying micro-operations for processing by the execute stage 16. The execute stage 16 is an example of processing circuitry for processing the micro-operations.

As shown in FIG. 1, the apparatus 2 includes a branch predictor 40 for predicting outcomes of branch instructions. The branch predictor is looked up based on addresses of instructions to be fetched by the fetch stage 6 and provides a prediction of whether those instructions are predicted to include branch instructions, and for any predicted branch instructions, a prediction of their branch properties such as a branch type, branch target address and branch direction (the branch direction indicating whether the branch is predicted to be taken or not taken). The branch predictor 40 includes a branch target buffer (BTB) 42 for predicting properties of the branches other than branch direction, and a branch direction predictor (BDP) 44 for predicting the not taken/taken outcome (branch direction). It will be appreciated that the branch predictor could also include other prediction structures such as a call-return stack for predicting return addresses of function calls, a loop direction predictor for predicting when a loop controlling instruction will terminate a loop, or other more specialised types of branch prediction structures for predicting behaviour of outcomes in specific scenarios. Branch misprediction detection circuitry 46 detects, based on outcomes of branch instructions executed by the branch unit 24, whether a branch has been mispredicted, and controls the pipeline 4 to suppress effects of the mispredicted branch instruction and cause execution of instructions to resume based on the correct branch outcome (e.g. by flushing operations that are younger than the branch in program order and resuming fetching from the instruction that should be executed after the branch). The prediction state data in the BTB 42 and branch direction predictor 44 is trained based on the outcomes of executed branch instructions detected by branch misprediction detection circuitry 46.

A data prefetcher 50 may be provided for predicting addresses of data expected to be accessed in response to future load/store instructions processed by the load/store unit 26. The prefetcher 50 can issue prefetch requests requesting that the data for the predicted addresses is prefetched to the cache 30, 32. The prefetch predictions can be based on monitoring of previously accessed addresses specified for load/store instructions handled by the load/store unit 26. Prefetching can help improve performance by increasing cache hit rates in the cache 32.

Predicated Loop Example (Memory Copy)

Figure 2:
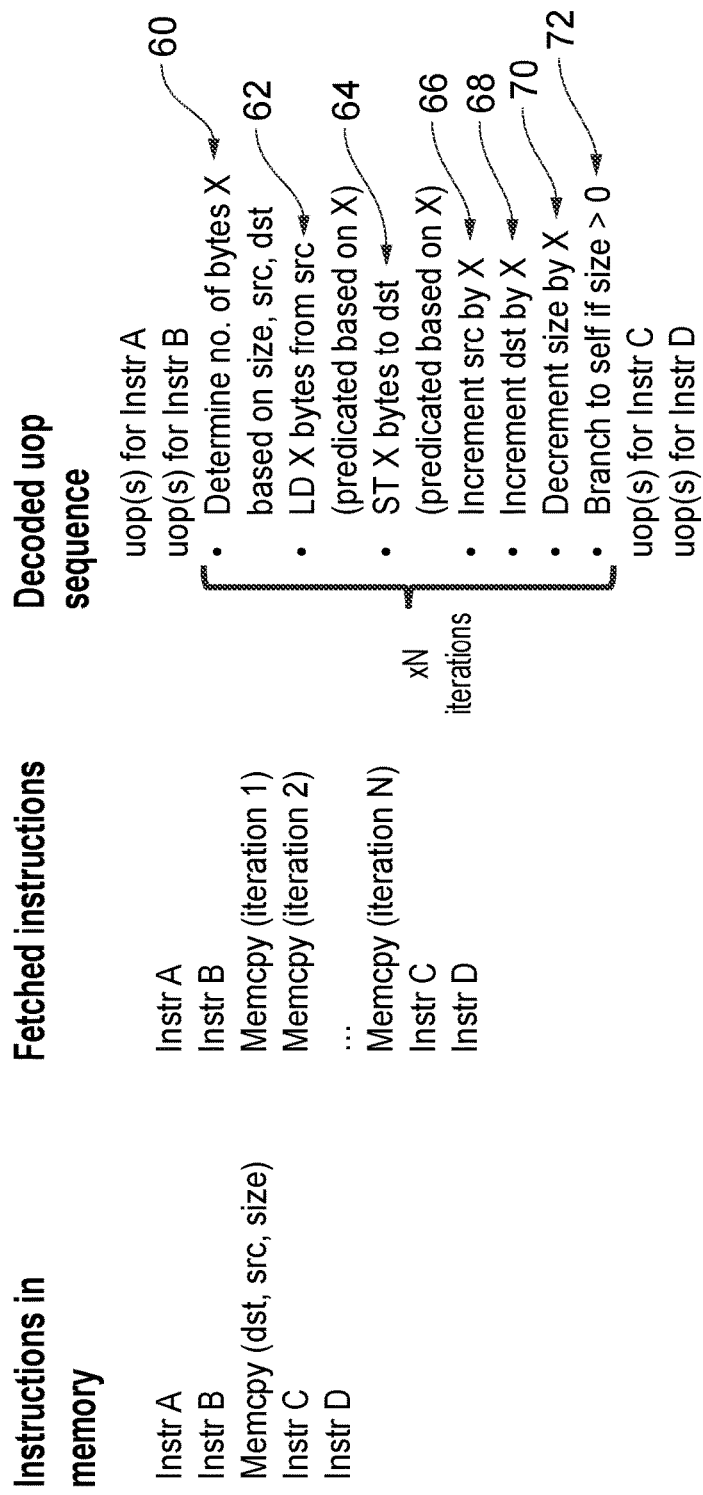
FIG. 2 illustrates an example of executing code including a memory copy (memcpy) instruction.

FIG. 2 illustrates processing of a memory copy instruction for copying data from a first memory region to a second memory region. The memory copy instruction is a particular example of a predicated-loop-body instruction. In this example, the memory copy instruction also serves as a predicated-loop-terminating branch instruction.

The memory copy instruction specifies a source address src identifying a first region of memory and a destination address dst identifying a second region of memory, as well as specifying a size parameter which identifies the number of bytes of data to be copied from the first region of memory to the second region of memory. Any addressing mode may be used to identify the address operands (e.g. using an absolute address, or as a relative address specified using an operand defining an offset, which could be specified relative to a base address stored in a register 14 or relative to an instruction address of the memcpy instruction itself). The left-hand portion of FIG. 2 shows a sequence of program instructions as they would be stored in memory prior to being fetched by the fetch stage 6. A single instance of the memory copy instruction is included surrounded by a certain number of other instructions A, B, C, D.

Although the size parameter of the memory copy instruction may specify a certain total number of bytes to be copied, that size may be greater than the maximum number of bytes that can be copied in a single instance of executing the memory copy instruction, and so the memory copy instruction may be interpreted as an implicit branch instruction which, if the number of bytes copied in response to a particular instance of the memory copy instruction is such that there are still some bytes remaining of the total number of bytes to be copied, then the memory copy instruction triggers a branch to itself, so that a further instance of the memory copy instruction is executed to represent a further iteration of a predicated loop (the size parameter can be decremented by the number of bytes processed on each iteration of the memory copy instruction to track how many bytes remain to be processed, and the source/destination addresses of the memory copy instruction can be incremented by the number of bytes processed so that each iteration of the memory copy instruction moves onto the next chunk of data in memory after the chunk processed in the previous iteration).

The branch predictor 40 can predict how many iterations of the memory copy instruction will be required before the loop terminates, so that it can control the fetch stage 6 to fetch the memory copy instruction the predicted number of times before moving onto the next instruction after the memory copy instruction. For example, the branch predictor 40 can use prediction state information stored in the BTB 42 or branch direction predictor 44, or prediction state information stored in a separate structure to the prediction structures 42, 44 used for predicting regular branches, to detect whether the loop should be terminated at a given iteration of the loop. If the number of iterations of the memory copy instruction is mispredicted, the branch misprediction detection circuitry 46 may (sometimes) trigger a flush of incorrectly scheduled micro-operations which should no longer be executed, and control the pipeline 4 to resume fetching operations from after the mispredicted branch, including fetching more instances of the memory copy instructions if required.

Hence, the middle portion of FIG. 2 shows the fetched sequence of instructions fetched by the fetch stage 6 when the program instructions stored in memory are executed. Note that, in the fetched instruction sequence as shown in the middle portion of FIG. 2, all of the instances of the memory copy instruction shown are actually different fetched instances of the same instruction fetched from the same instruction address, where the branch predictor 40 has predicted that N iterations of the loop will be needed before the loop termination condition occurs (which in this case is when the size parameter indicates that the number of remaining bytes to be processed has reached zero).

The right-hand portion of FIG. 2 illustrates a decoded sequence of micro-operations generated by the decode stage 10 corresponding to the fetched instruction sequence shown in the middle part of FIG. 2. For a given instance of fetching the memory copy instruction for a particular iteration of the memory copy loop, that instance of the memory copy instruction is mapped by the decode stage 10 to a group of multiple micro-operations 60-72 which collectively implement a single iteration of the memory copy loop. Hence, in the example shown in FIG. 2 where N iterations of the memory copy loop are required, there will be N sets of the group of micro-operations 60-72 illustrated with the bracket (FIG. 2 only shows one iteration of these micro-operations for conciseness).

The micro-operations generated for a particular iteration of the memory copy loop include at least one micro-operation 60 to determine a variable number of bytes X based on the size parameter, the source address and/or the destination address (while FIG. 2 shows a single micro-operation 60, other implementations may need more than one micro-operation to assess the addresses and calculate the number of bytes). The number of bytes X may be selected so as to not exceed the number of bytes indicated by the size parameter, which may indicate a maximum number of bytes allowed to be copied in response to the current iteration of the memory copy loop. However, the micro-architecture of the processing circuitry 16 may have the flexibility to vary the number of bytes X selected, depending on micro-architectural implementation choice. In general, the particular value selected for X can vary from implementation to implementation (e.g. some implementations may support a greater maximum size for X than others) and between different iterations of the memory copy loop, even when all the operands (destination address, source address, size) are the same. This flexibility is possible because the update made to the size parameter and source/destination memory addresses in response to the current iteration of the predicated loop will account for the number of bytes that have actually been copied and then this will cause the operation of subsequent iterations of the memory copy loop to be adjusted accordingly so that the overall effect of the loop as a whole can be the same even if the particular number of bytes processed in a particular iteration varies.

For example, the variable number of bytes X could be determined based on the alignment of the source address and/or the destination address with respect to an address alignment boundary. The memory system 34 may be able to handle memory accesses more efficiently if a request is made specifying an address which is aligned to an address alignment boundary than when an unaligned access to a block of data which spans an address alignment boundary is requested. This is because some internal control mechanisms of the memory system, such as control logic and queues associated with a cache, interconnect or memory controller, may assume that requests specify an address aligned to an address boundary corresponding to an address block of a certain size such as a certain power of 2 number of bytes, and so if a block of data crossing such an address alignment boundary has to be accessed, then the load/store circuitry 26 may split the memory access into a number of separate requests each specifying a portion of data which does not cross the address alignment boundary.

For the memory copy loop, if the source/destination address is unaligned for the first iteration of the memory copy loop, and each iteration selects as the number of bytes X the maximum possible number of bytes that can be processed in one iteration, the source/destination address after the update performed in that iteration may still be unaligned, so the next iteration would then also make an unaligned access. Hence, if each iteration requires an unaligned access, this may increase the overall number of requests that need to be made the memory system because on each iteration of the memory copy loop an access to an unaligned block may require multiple separate memory access requests to be issued to memory. In contrast, if most iterations of the memory copy instruction can perform an aligned access then this may only require one memory access request to be issued per iteration, which can reduce the total amount of memory bandwidth consumed by the accesses to memory and hence improve performance.

Therefore, it can be useful on the first iteration of the memory copy loop, if the source address or destination address is unaligned, to select the variable number of bytes X so that, even if the hardware would be capable of handling an access to a greater number of bytes in the current iteration, X is selected so that for a subsequent iteration of the memory copy loop at least one of the source address and the destination address becomes an aligned address aligned to an address alignment boundary. For example, X may be selected based on the difference between the source address and the address representing the next address alignment boundary after the source address, or based on the difference between the destination address and the address representing the next address alignment boundary after the destination address. In cases where the alignment of the source address relative to an address alignment boundary is different compared to the alignment of the destination address relative to an address alignment boundary, it may not be possible to align both the source and destination addresses to the alignment boundary for the next iteration of the memory copy loop, and so in that case some implementations may choose to prioritise the load alignment and other implementations may choose to prioritise the store alignment.

Figure 3:
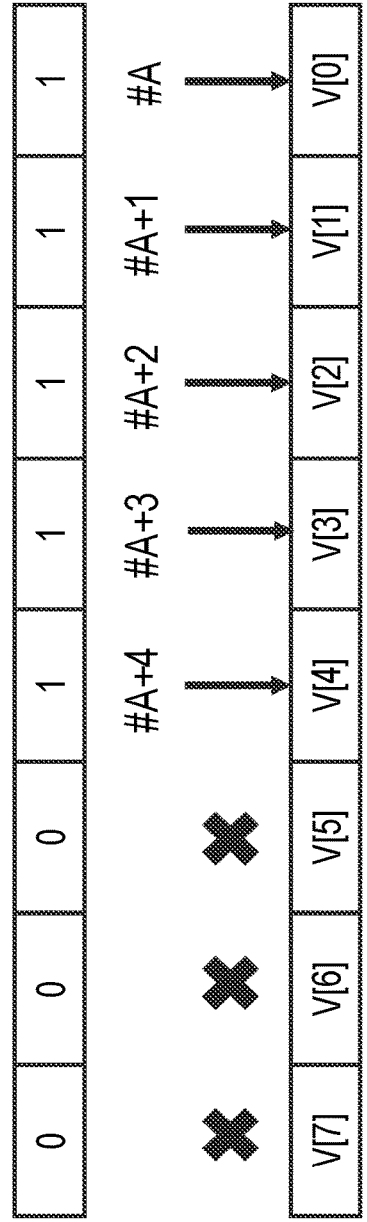
FIG. 3 illustrates an example of a predicated load micro-operation.

Also, the micro-operations generated for a particular memory copy instruction iteration include a predicated vector load micro-operation 62 which loads a destination vector register with at least X bytes of data obtained from memory system locations identified based on the source address src. FIG. 3 illustrates an example of the predicated vector load micro-operation 62. The destination register of the load micro-operation comprises a number of vector elements (e.g. 8 vector elements V[0] to V[7] in this particular example), and the source address src (assumed to be equal to #A in this example) identifies the data to be loaded to the first of the vector elements, V[0], with the subsequent vector elements being loaded with data associated with addresses which are generated by applying successive address increments to the address #A specified by the source address parameter. In this example, the increment between the addresses associated with two adjacent vector elements is 1 byte, but it would also be possible for predicates to be applied at a granularity larger than 1 byte. The predicate operand specifies which vector elements are active and which vector elements are inactive. For example, the predicate can be represented as a mask for which bit values equal to 1 indicate the positions of the active vector elements in the destination register and bit values equal to 0 indicate the positions of the inactive vector elements. In this example, the first five elements of the vector are active and the remaining three elements are inactive, indicating that vector elements V[5] to V[7] should have the corresponding load operations suppressed. Hence, if the micro-operation had determined that the number of bytes X to load equals 5 then the predicate could be generated as shown in FIG. 3 to indicate that 5 bytes of data should be loaded to the first five elements of the vector.

As shown in FIG. 2, the set of micro-operations generated for a given memory copy instruction also includes a predicated vector store micro-operation 64 which stores the variable number X of bytes from a source register (which can be specified to match the destination register used by the load micro-operation 62) to memory system locations identified based on the destination address (again, the address corresponding to each vector element of the source vector register can be identified based on applying address increments to the destination address). Similar to the load micro-operation shown in FIG. 3, a predicate operand can be generated to predicate the store operations and ensure that the data from active elements of the store source register are saved to memory while store operations are suppressed for the inactive vector elements. The number of active elements indicated by the predicate operand may be determined based on the number of bytes X determined by micro-operation 60. The store micro-operation 64 may share the same predicate operand as the load micro-operation 62.

Hence, the combination of the load micro-operation 62 and the store micro-operation 64 can implement the required memory copy operation to copy X bytes of data from the source memory region to the destination memory region. The loop of decoded micro-operations then includes a number of micro-operations for maintaining the address and size parameters of the memory copy instruction to account for the number of bytes of data which have already been processed. Micro-operations 66, 68 increment the source address and the destination address respectively by X, the copied number of bytes, so that the source and destination addresses for a subsequent iteration of the memory copy loop will be advanced in memory by X bytes. Also, micro-operation 70 is generated which causes the size parameter of the memory copy instruction to be decremented by X, so that the number of bytes of data remaining to be copied can be indicated to be X bytes fewer than was the case for the current iteration.

The set of micro-operations for a given instance of the memory copy instruction also includes a branch micro-operation 72 which performs a conditional branch to the instruction address of the memory copy instruction itself, with the branch being taken if the size parameter after the update performed by micro-operation 70 is greater than 0 and the branch being not taken if the size parameter is 0. That is, this branch is conditional on whether the loop termination condition for the loop is satisfied. Although not shown in FIG. 2 for conciseness, in some instruction set architectures there may also be a need for an intervening compare instruction between micro-operation 70, 72 to compare the size parameter with 0 and set a condition status flag accordingly, which the branch micro-operation 72 can used to determine whether to take the branch.

Hence, each iteration of the memory copy loop may perform the memory copy operation for a certain number of bytes X which is limited, as a maximum, to the number of bytes indicated by the size parameter but is allowed to be smaller, and then the determined number of bytes are copied from source region of memory to a destination region of memory and the addresses and size parameter are updated accordingly and if it is still necessary to perform a further iteration of the loop because there is at least one remaining bytes to be copied then a branch to the memory copy instruction itself is triggered. In other examples, the operations indicated by micro-operations 60-72 could have been represented by separate program instructions in the representation of the program stored in memory, rather than being cracked by the instruction decoder 10 from a single memory copy instruction. Also, it will be appreciated that there could be other ways of adjusting the source/destination addresses and the size parameter in each iteration of the loop, so the particular example of incrementing src and dst by X and decrementing size by X is just one example.

Memory copy (memcpy) functions are one example where such a predicated loop of operations can be useful. However, there are also other library functions in programming languages such as C for which a similar technique can be useful. For example, the string.h C library functions for string processing can be implemented using a similar iterative technique where a certain operation is performed on a variable number of bytes and a loop is iterated a number of times until the required number of bytes have been processed. In the memory copy example, the predicated vector load micro-operation 62 is followed by a predicated vector store micro-operation 64, but other string processing functions could have a different operation after the predicated vector load micro-operation 62.

For example, the memcmp( ) function, which is for comparing N bytes of two strings to determine whether they are the same, may provide a predicated vector compare micro-operation instead of the vector store micro-operation 64. The predicated vector compare operation may perform an element-by-element comparison of the vector loaded by the load micro-operation 62 with a second vector representing a string to be compared (e.g. each element of the two vectors may represent one character of the respective strings), and a comparison result may be set depending on the comparison outcomes of each pair of active elements within the two vectors (and depending on the comparison outcome of any preceding iteration of the loop). A predicate operand (generated based on the variable number of bytes determined at micro-operation 60) can be used to ensure that the comparison outcomes for any inactive elements do not contribute to the comparison results.

Another example of a string processing function which could use a similar approach is the strlen( ) function which detects the length of string stored at a particular region of memory, by loading the string from memory and searching for the position of the first byte of data having a value of 0 after the start of the string. This can be implemented using a loop as shown in FIG. 2 where the vector load 62 loads a portion of the string from memory and a subsequent vector comparison instruction performed instead of the store micro-operation 64 compares each of the loaded bytes of data against 0. Again, a predicate operand can be used to predicate the load operation so that the number of bytes X processed in a given iteration may be selected so as to cause the source address for the next iteration to be an aligned address to improve performance, and this predicate operand may then also predicate the subsequent compare micro-operation to ensure that the overall comparison results does not incorrectly depend on data within an inactive element of the vector.

Another example of a string processing function which could use a similar approach is the memset( ) function which sets each byte within a given destination region of memory to a certain predetermined value, where the number of bytes updated in the destination region of memory is determined based on a parameter of the instruction, and again an iterative approach can be used where each iteration determines a certain number of bytes X to be processed (e.g. based on the maximum size supported for the memory transaction, the number of remaining bytes, and address alignment), and then issues a predicated store predicated based on the determined number of bytes X, before updating the store address and the number of remaining bytes parameter based on the variable number of bytes X processed in that iteration, and then conditionally branching for another iteration of the loop body if there is still at least one further byte remaining to be processed. For memset( ) there would be no need for the predicated loop body to include the predicated load micro-operation 62 shown in FIG. 2.

It will be appreciated that these are only some examples of processing functions which could use the technique discussed below. Although FIG. 2 shows an example where the micro-operations for a given iteration of the predicated loop body are generated by the instruction decoder 10 in response to a single combined instruction, it would also be possible in other implementations for the operations of the predicated loop body to be defined a separate program instructions in the representation of the program code stored in memory. Also, while FIG. 2 shows an example where the instruction that controls the performance of all or part of the predicated loop body also triggers the conditional branch depending on whether the loop termination is satisfied, it would also be possible for the conditional branch on each iteration of the predicated loop body to be performed in response to a micro-operation generated in response to a separate branch instruction included in the program code stored in memory separate from the instruction implementing the predicated loop body of the memcpy or other string processing function.

Memory copy functions and other string processing functions are some of the most common library functions to be used by software applications. Applications using these functions can therefore see a significant performance improvement if processing of these functions can be accelerated. Including a dedicated program instruction in the instruction set architecture, such as the memcpy instruction shown in FIG. 2, can help to reduce the overhead of fetching instructions from the cache or memory, although this is not essential and as mentioned above it would also be possible to promote these functions using a number of separate program instructions. Nevertheless, the performance achieved for such instructions may depend on the way in which branch prediction is handled for these instructions, because the branch predictor 40 may need to predict how many iterations of the operations associated with the predicated loop body are to be fetched and issued for execution. This depends on prediction of the outcome of a predicated-loop-terminating branch instruction, such as the memcpy instruction shown in FIG. 2 or a separate conditional branch instruction following the instructions) of the predicated loop body of such a predicated loop, and that outcome may be relatively hard to predict because the point at which the loop terminates may be affected both by memory address alignment and copy data size (the total number of bytes required to be processed, as specified by the remaining bytes parameter provided for the first iteration of the loop).

Typically, the processing circuitry 16 can adjust the number of bytes X selected for copying in a given loop iteration based on load/store address alignment, because modern CPUs generally prefer to load/store data with a certain aligned address (e.g., 16-byte aligned, or aligned to some other boundary associated with a block size corresponding to a certain power-of-2 number of bytes). To force this alignment, the memcpy function in the predicated loop body can copy a small number of bytes instead of processing entire word in the first iteration, so that the address for the next iteration becomes aligned.

For example, in the case of memcpy(dst, src, 30), the number of iterations for the entire memcpy loop can vary based on the address alignment (assuming 16-byte alignment in this example):
(a) Src=0x100
  Iter-1: Copy 16 bytes//after iter-1, src=0x110, remaining size=14
  Iter-2: Copy 14 bytes
(b) Src=0x1fc
  Iter-1: Copy 4 bytes//after iter-1, src=0x200, remaining size=26
  Iter-2: Copy 16 bytes//after iter-2, src=0x210, remaining size=10
  Iter-3: Copy 10 bytes The application may see further divergence when input size is different (e.g. size=10 and size=100 will cause different control flow).

Therefore, the total number of iterations required can diverge significantly depending on the data-dependent inputs to the predicated loop function, which makes predicting the outcome hard for the branch prediction circuitry. As shown in FIG. 1 the branch predictor 40 may have a prediction structure (e.g. BIB 42, branch direction predictor 44, or a separate prediction structure), which can be used to predict whether a given iteration of the loop terminating branch within the predicated loop will terminate the loop. A number of entries may be maintained, looked up based on lookup information such as an instruction address associated with an instruction corresponding to the loop, such as the memcpy instruction shown in FIG. 2, and/or history information indicative of a history of program flow leading up to that instruction (e.g. global branch history updated based on a sequence of taken/not-taken outcomes for a number of recent branches). Each entry could track, for example, the predicted number of iterations of the loop, or in other examples could correspond to a specific iteration of the loop and indicate whether the loop terminating branch on that iteration is predicated to be taken or not taken. While such predictions can help to partially reduce the number of branch mispredictions for such predicated loops, there may still be a significant number of mispredictions because the number of required iterations may vary for some loops from one instance to another based on the size and address alignment of the operands, and so the behaviour learned from a previous instance of the loop may no longer be accurate. Some techniques for reducing the latency penalty associated with such branches are discussed below.

Suppression of Flushing Unnecessary Iterations of Predicated Loop Body

Figure 4:
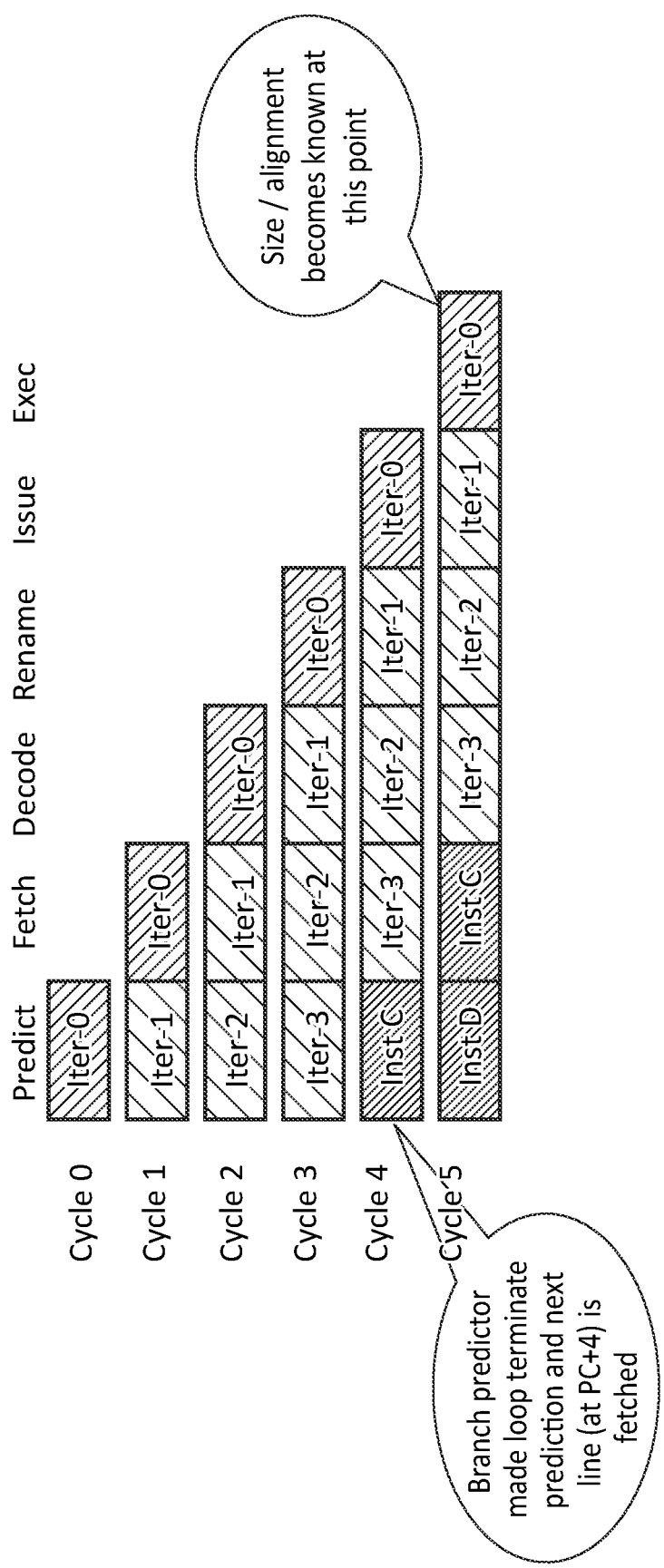
FIG. 4 is a pipeline diagram illustrating processing of a number of iterations of a predicated loop body.

FIG. 4 shows a general pipeline diagram illustrating processing of a number of iterations of the predicated loop body using a processing pipeline having a number of pipeline stages. In this example the pipeline stages include: a prediction stage corresponding to the operation of the branch predictor 40, the fetch stage 6, the decode stage 10, a register renaming stage (not illustrated in the example of FIG. 1) at which architectural register specifiers specified by the decoded instructions are mapped (renamed) to physical register specifiers identifying registers 14 provided in hardware (other examples may omit the register renaming stage); the issue stage 12; and the execute stage 16. Of course, this is just one example of a possible set of pipeline stages.

Instructions or micro-operations associated with each iteration of the loop progress from stage to stage of the pipeline so that while the instructions or micro-operations associated with an earlier iteration are at a later stage of the pipeline, the instructions or micro-operations associated with a later iteration can be processed at an earlier stage of the pipeline. In this example, for conciseness it has been assumed that the operations performed at a given stage for a given iteration of the predicated loop can be completed in one processing cycle (even if the processing operations corresponding to that iteration are mapped to multiple micro-operations by the decode stage 10). It will be appreciated that other implementations could take more than one cycle for some stages and so the particular timings shown in FIG. 4 are just one example.

In cycle 0, the branch predictor 40 receives, as an address for which a branch prediction should be made, an address of an instruction corresponding to iteration 0 of the loop, and predicts that the loop termination condition will not be satisfied so that a further iteration, iteration 1, will be required. Similarly, the branch predictor 40 continues to predict that the loop termination condition will not be satisfied for subsequent iterations, until when predicting the outcome of iteration 3 the determination condition is predicted to be satisfied, so that the prediction is that after iteration 3 is complete, the next instruction should be instruction C which follows the loop (as instruction C is the instruction following the memcpy instruction in the example of FIG. 2). Based on these predictions the branch predictor 40 controls the fetch stage 6 to fetch the required number of iterations of the instructions corresponding to the program loop body (e.g. a single memcpy instruction per iteration in the example of FIG. 2), and the subsequent stages then carry out their respective functions of decoding, renaming (if supported) and issuing, before the decoded micro-operations reached the execute stage for iteration 0 in cycle 5 in this particular example. At the point when the micro-operations corresponding to iteration 0 reach the execute stage 16, the operands for the micro-operations in iteration 0 are available, for example, the size parameter which determines the number of remaining bytes to be processed and the address for which the load/store is to be performed become known. These parameters can be used to determine whether the conditional branch for iteration 0 should have been triggered, and so at this point the branch misprediction detection circuitry 46 can determine whether the branch prediction for iteration 0 was correct.

Figure 5:
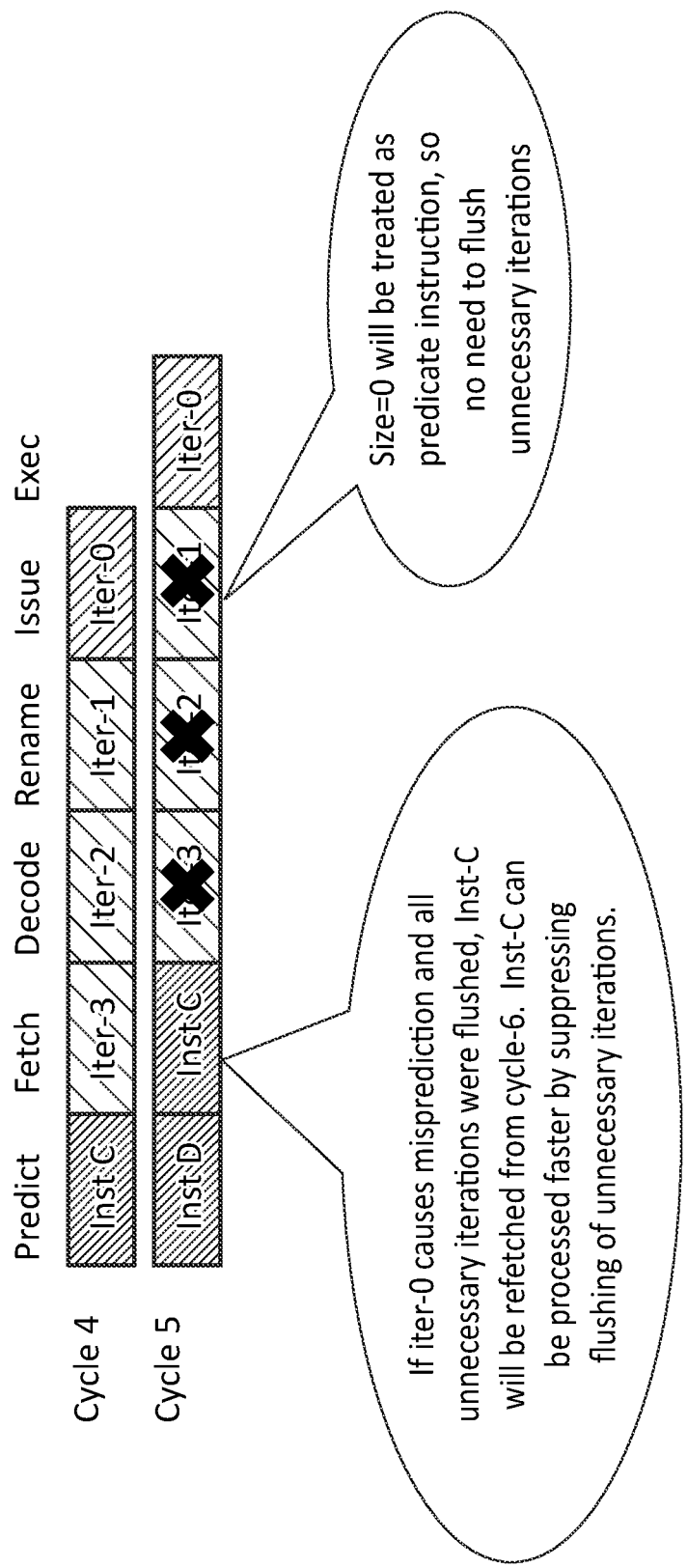
FIG. 5 is a pipeline diagram illustrating suppression of flushing of unnecessary iterations of the predicated loop body.

Normally, if it is now determined that a branch prediction was incorrect, the response taken by the branch misprediction detection circuitry 46 would be to flush the pipeline of any operations which are younger than the micro-operation for which the misprediction occurs, and so if iteration 0 is mispredicted as shown in the example of FIG. 5, one would normally expect to flush the micro-operations associated with iterations 1, 2, 3 which were unnecessary iterations which should not have been fetched. Normally, after triggering such a flush, fetching of instructions may then resume from the correct instruction which should have executed after the mispredicted branch.

However, in the example of FIG. 5, if a flush was triggered in response to the misprediction arising for iteration 0, this would flush the pipeline of all the remaining younger micro-operations after iteration 0, and re-fetching of the instructions to be processed after the branch would then commence in cycle 6 after the cycle 5 in which the branch misprediction was identified. In the example shown in FIG. 5, the correct number of loop iterations to be executed for the predicated loop should have been 1, so that the following instruction C should have been executed directly after the operations associated with iteration 0 of the predicated loop.

As shown in FIGS. 4 and 5, at the point when the branch misprediction is identified in cycle 5 when the micro-operations for iteration 0 reach the execute stage, the following instruction C may already have been fetched and be resident within the pipeline. Therefore, the following instruction C to be processed based on the correct branch prediction outcome can be processed faster by not flushing micro-operations after the mispredicted branch for iteration 0, but instead allowing the unnecessary loop iterations 1, 2, 3 to remain in the pipeline without being flushed. This is possible because the nature of the predicated loop body is such that if it is executed unnecessarily following a mispredicted-non-termination branch misprediction when the loop termination condition was predicted to be not satisfied when it should have been satisfied, then in any case the predication used for the operations within the predicated loop body means that the architectural effects of the unnecessarily executed operations will be suppressed. Using the example shown in FIG. 2, for instance, if an unnecessary loop iteration is carried out then the size parameter supplied for that iteration will be 0 (since if the correct outcome of the loop termination condition evaluation in the preceding iteration was that the loop should have terminated, this implies that the size was equal to 0 at the end of that iteration). If the size parameter is 0, then the load/store operations will be predicated to suppress the effects of the load/store (e.g. the destination register of the load will not be updated with data loaded from memory, and issuing of store requests to memory may be suppressed for the store operation when the predicate indicates that all the elements of the vector are inactive because the required number of bytes to be stored is 0). Similarly, incrementing the address parameters by X and decrementing the size by X will have no architectural effect if X=0. Therefore, it is possible to allow the micro-operations corresponding to unnecessary loop iterations fetched following a branch misprediction to remain without being flushed. By suppressing the flushing of the unnecessary iterations, the next instruction can be processed faster.

Early Pipeline Flush when Loop Predicted to Terminate Too Early

FIG. 5 shows an example where the branch predictor over-predicted the required number of loop iterations, leading to some unnecessary loop iterations being fetched for processing.

Figure 6:
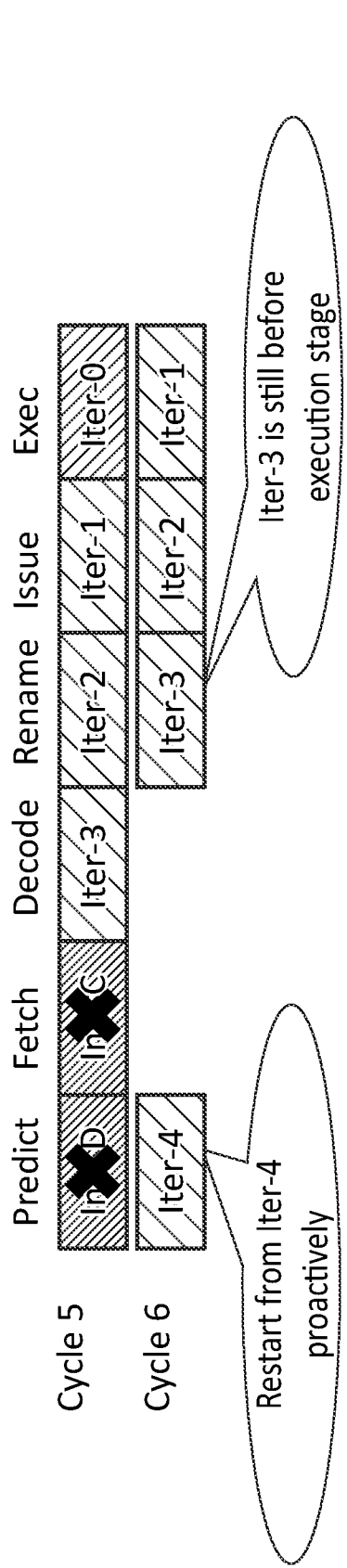
FIG. 6 is a pipeline diagram illustrating early flushing of iterations of the predicated loop body.

However, as shown in FIG. 6 it is also possible for a branch misprediction to cause insufficient loop iterations to be fetched for processing. For example, in FIG. 6 the branch predictions were correct for iterations 0, 1 and 2, but when making the prediction of whether the loop termination was satisfied for iteration 3, the branch predictor 40 predicted that the loop termination condition would be satisfied when it actually should not have been satisfied, so the fetch stage 6 fetched the next instructions C, D when a further loop iteration Iter-4 should have been fetched. Hence, the following instructions C, D fetched into the pipeline based on the loop termination prediction predicted for iteration 3 should be flushed and fetching should resume from iteration 4 so that at least one further iteration of the predicated loop body will be processed.

Normally, one would expect that branch mispredictions would be resolved when the mispredicted instruction or micro-operation reaches the execute stage 16 at which the operands of that instruction or micro-operation become available. Therefore, in a typical approach in the scenario shown in FIG. 6, one would expect that the branch misprediction for iteration 3 would be resolved when iteration 3 reaches the execute stage 16. However, for predicated loops of the type shown in FIG. 2, it is recognised that the total number of required loop iterations can be deduced from the operands provided for the very first iteration of the loop (in this case, iteration 0). For example, the total number of iterations can be deduced from the size parameter and load/store address provided for the first iteration of the loop and an indication of the maximum number of bytes that can be processed in a single iteration. Some circuit logic may be provided to analyse the address alignment and the size parameter and use this to calculate how many loop iterations will be required in total. For example, for the examples (a) and (b) provided above, this circuit logic may determine that the required number of iterations is 2 and 3 respectively. Hence, at the time that the first iteration 0 reaches the execute stage, the branch misprediction detection circuitry 46 can already detect whether any of the subsequent iterations have been mispredicted by the branch predictor 40, even though the micro-operations for those subsequent iterations have not yet reached the execute stage 16. If the mispredicted iteration is iteration 3, say, there is no need to wait for the corresponding micro-operations associated with iteration 3 to reach the execute stage before triggering the flush of the incorrectly fetched instructions C, D, and instead a flush can be initiated early, where rather than flushing all operations younger than the micro-operation currently at the execute stage 16, the flush can flush from the pipeline the operations which are younger than the micro-operations corresponding to the mispredicted iteration 3, which in the example of FIG. 6 is currently at the rename stage.

This early flushing of operations is possible because the nature of the predicated loop is such that the total number of micro-operations generated by the instruction decoding stage 10 per loop iteration remains fixed for every loop iteration, so that based on the loop iteration currently at the execute stage and the number of further iterations expected before the iteration which was mispredicted, the branch misprediction detection circuitry 46 can identify an instruction identifier or other indication associated with the point of program flow beyond which instructions or micro-operations should be flushed from the pipeline, even if the branch misprediction detection circuitry 46 does not currently have those instructions or micro-operations available at the execute stage. For example, if the fixed number of micro-operations performed per loop iteration is M and the micro-operation identifier associated with the iteration at the execute stage when the branch misprediction for a subsequent iteration is identified is uid, and it is assumed that the instruction decoder will sequentially allocate micro-operation identifiers in an order corresponding to the program order as it generates micro-operations, then the micro-operation identifier representing the point beyond which micro-operations should be flushed from the pipeline may be uid+N*M, where N is the number of additional iterations of the loop that were fetched after iteration 0 before the iteration which encountered the misprediction is reached (e.g. for the example in FIG. 6, N=3). Hence, with this approach, when a mispredicted-termination branch misprediction occurs, the corresponding flush of the pipeline can be initiated early even though the iteration that encountered that misprediction has not yet reached the execute stage. Again, this can improve performance because the iteration 4 which should have executed after iteration 3 can be re-fetched earlier than would be the case if the flush was not is initiated until iteration 3 which the execute stage.

Figure 7:
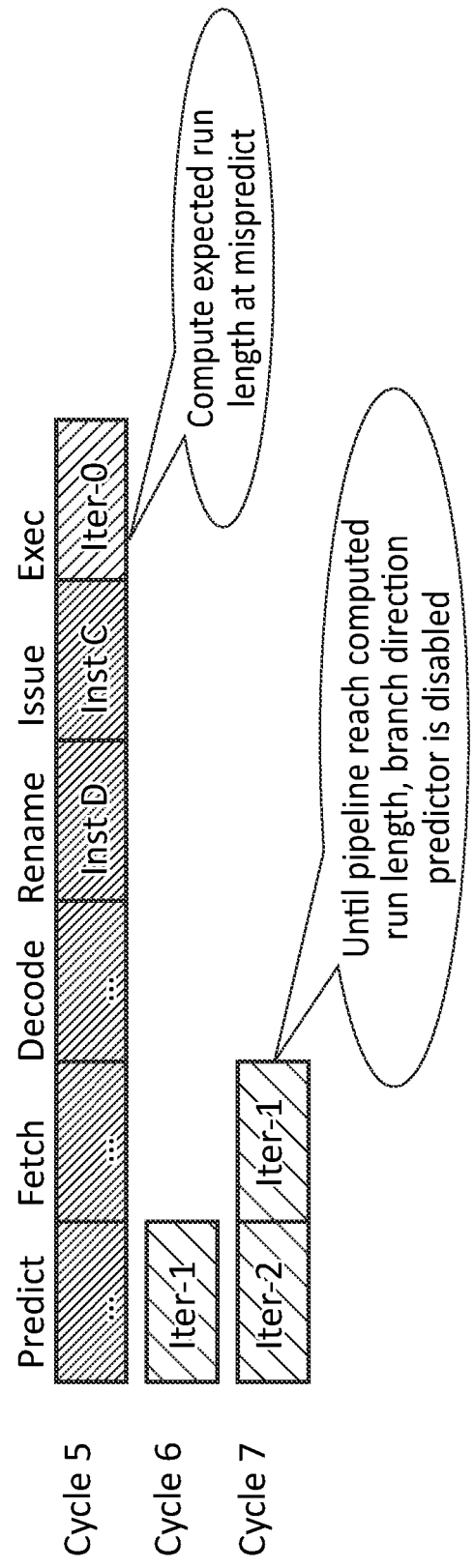
FIG. 7 illustrates disabling branch prediction circuitry from making branch predictions based on branch direction prediction state obtained prior to encountering a first iteration of the predicated loop body, following a mispredicted iteration of the predicated loop body.

Use of Run Length Computed at First Loop Iteration to Predict Outcome of Subsequent Iterations Another problem with performing branch prediction for predicated loops of the type discussed above may be back-to-back branch mispredictions where the branch outcome is mispredicted for several successive iterations within the same predicated loop. As shown in FIG. 1, the branch predictor 40 may store prediction state information for predicting the loop termination condition outcome for a given iteration of the predicated loop body, based on information learnt from previous attempts to perform the same loop. However, a problem is that when training the predicated loop prediction structure 48, the number of iterations executed within the loop may vary from one training run to another, so there can be frequent mispredictions. FIG. 7 shows a technique for mitigating against this problem. In response to the first iteration of the predicated loop body, the execute stage 16 can determine, based on the operands of the first iteration, the actual run length (number of iterations) expected for the loop. This is possible because the number of bytes of data processed per loop iteration is deterministic once the operands (such as the load/store address and the required number of bytes to be processed) are known. The actual run length can be stored by the branch predictor (e.g. in a side structure, such as a register or cache structure separate from existing branch prediction structures 42, 44, or in an existing structure 42, 44 of the branch predictor 40 which can have entries reused for other types of branch prediction information). Unlike the prediction state information used for predicting the number of iterations initially, which is learnt from previous attempts at executing the loop, the expected run length may indicate information detected from the current attempt at executing the loop, when the processing circuitry has resolved the actual number of loop iterations based on operands of the first loop iteration.

For the remaining iterations of the loop, the use of the trained prediction state stored in the prediction structures 42, 44 (based on past observations of attempts at executing the loop) for making branch predictions can be disabled, since the outcome of the branch in subsequent iterations can be predicted more accurately from the actual run length computed based on the operands of the first iteration of the current attempt at executing the loop. By disabling the branch predictor 40 from making branch predictions based on state learnt before the first iteration of the current loop was encountered, this improves performance by using the more reliable actual information derived from the first loop iteration. Once the loop has terminated, the branch predictor 40 re-enables dynamic prediction based on prediction state stored prior to encountering the first iteration of the predicated loop.

Branch Predictor Training for Long Loops

Figure 8:
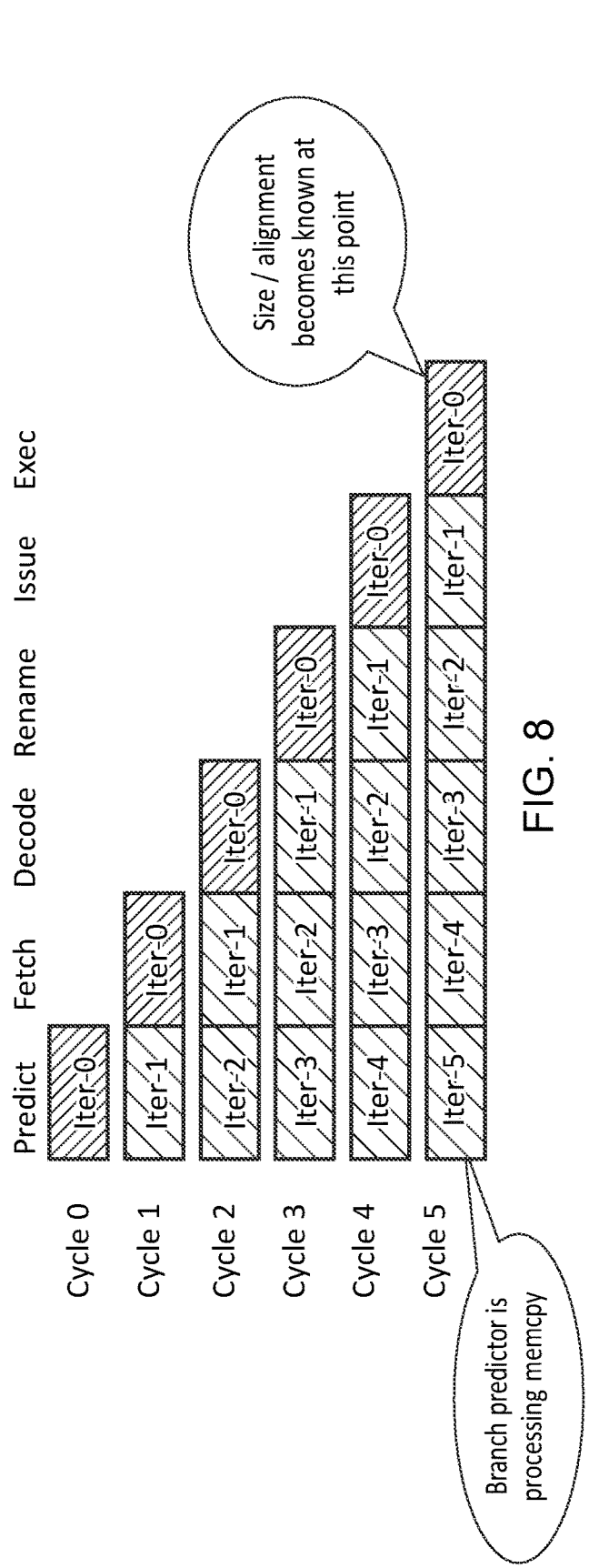
FIG. 8 illustrates a long loop example where, at the time of determining the outcome of a first iteration of the predicated loop body, the branch prediction circuitry has not yet predicted termination of the loop.

FIG. 8 illustrates an example when the number of iterations required for the predicated is relatively large so that when the first iteration reaches the execute stage 16, the branch predictor 40 has not yet made a loop termination prediction for a subsequent iteration of the loop. Hence, at the point when the number of bytes (size) to be processed and the alignment of the addresses becomes known, the branch predictor 40 is still processing instances of the predicated-loop-terminating branch instruction.

Figure 9:
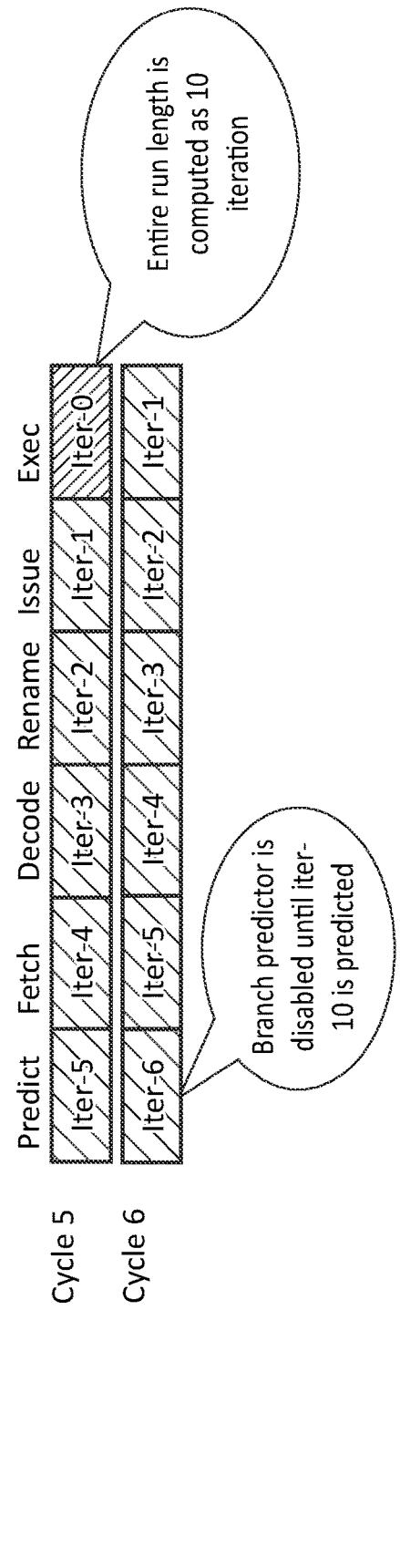
FIG. 9 illustrates an example of controlling fetching of subsequent iterations of the predicated loop body using a run length computed in response to execution of an initial iteration of the predicated loop body.

As shown in FIG. 9, the computation of the actual run length for the loop at the first loop iteration can also be useful in this scenario with a relatively long loop. Again, the actual run length is computed when the first iteration of the loop reaches the execute stage 16, and the actual run length is provided to the branch predictor 40 as discussed above FIG. 7. As in FIG. 7, branch direction predictions made by the branch predictor 40 using prediction state 44 trained based on previous instances of encountering instructions prior to the first iteration of the current instance of the loop are disabled at this point, and for the remaining iterations of the current loop the actual run length is used to determine whether each iteration should terminate the loop or continue for another iteration. Hence, the subsequent iterations will be predicted as not satisfying the termination condition, until the iteration count reaches the actual run length for a given iteration, at which point the given iteration is predicted as satisfying the termination condition. Predictions based on previously stored prediction state can be re-enabled once the loop has been predicted to terminate. Again, this approach improves performance by reducing the likelihood of branch misprediction, because the branch outcome for each iteration can be predicted more accurately based on the actual run length determined at the first loop iteration based on the actual operands for the current instance of executing the loop, than is possible using the state information stored by branch predictor 40 which is trained based on previous attempts at execute the same loop which may have had different operands and therefore a different number of iterations.

Variation of Micro-Operation Supply Rate

As shown in FIGS. 8 and 9 described above, the actual run length (number of loop iterations) for a given instance of the loop can be resolved at the processing circuitry 16 once the operands for the first loop iteration are available. Beyond that point, dynamic branch prediction can be disabled and the fetch stage 6 can simply continue fetching further iterations up to the number of iterations indicated by the actual run length. This is more reliable than relying on dynamic branch prediction based on prediction state derived from previous instances of encountering the same loop which may have had different operands.

Given the predication of the micro-operations decoded for each loop iteration, the performance penalty associated with under-predicting the number of loop iterations may be much greater than the performance penalty associated with over-predicting the number of loop iterations, because for an under-prediction this can lead to the next instructions C, D after the loop being fetched too early and being required to be flushed to allow for further loop iterations to be fetched as shown in FIG. 5, while for an over-prediction the penalty is merely the power cost of unnecessarily processing some additional micro-operations which have no architectural effect but consume pipeline slots, and no flush is required.

Some instances of the loop may be much harder to predict than others. The branch predictor 40 may track a level of confidence in the prediction, which may be based on the frequency of misprediction is identified on previous instances of the predicated-loop-terminating branch (e.g. the memcpy instruction shown earlier).

For a hard-to-predict instance of the branch, associated with a relatively low level of confidence in the prediction of the number of loop iterations required, it can be useful to be able to slow down the rate at which front-end circuitry 6, 10 supplies micro-operations associated with the loop for processing by the processing circuitry 16. By reducing the supply rate, the front-end circuitry ensures that fewer iterations of the loop have already been supplied by the time that the first iteration reaches the execute stage 16 and the actual number of loop iterations is resolved, so that it is more likely that the scenario shown in FIG. 9 occurs where the actual run length was determined before ail the required loop iterations have been supplied and no flush is needed, compared to the situation shown in FIG. 5 or 6, where a flush is required because the subsequent instructions C, D have already been supplied by the time the actual number of loop iterations is resolved for the first loop iteration at the execute stage 16.

For other more confidently predictable instances of the loop-terminating branch, it is not so useful to reduce the supply rate with which the micro-operations are supplied for processing, as the probability of a misprediction may be lower and so average performance may be higher by supplying micro-operations for the loop to the execute stage 16 at a higher rate.#

Hence, varying the supply rate based on the level prediction confidence can help to improve performance. While a predicated-loop-terminating branch instruction is shown above as an example of the loop-terminating branch instruction, the supply rate variation could also be applied to examples where the loop body is not a predicated loop (although in that case it may be desirable not to supply any further loop iterations predicted to be unnecessary, and instead reduce to a zero supply rate once the predicted number of loop iterations have been supplied).

FIGS. 10, 11 and 12 show pipeline timing diagrams illustrating how, counter-intuitively, performance can be improved by slowing down the rate at which the front-end circuitry 6, 10 supplies micro-operations associated with the loop. In this example, the supply rate is controlled by the branch predictor 40 adjusting the rate at which the fetch stage 6 is supplied with addresses of instructions to be fetched. In other examples, the supply which could be controlled by the fetch stage 6 varying the rate at which it fetches instructions, or by the decode stage 10 varying the rate at which it decodes the fetched instructions and supplies the decoded micro-operations to downstream stages of the pipeline. FIGS. 10-12 are based on a pipeline example which has the following stages:

P0: branch prediction stage by branch predictor 40;
F0, F1, F2: instruction fetching by fetch stage 6;
DEC1: instruction decoding to generate micro-operations, by decode stage 10;
REN: register renaming by a register renaming stage;
DISP: dispatch of renamed instruction to the issue queue 13;
I0, I1, I2: issue stage operations to determine when operands are available and issue micro-operations to the execute stage 16;
E1, E2: execution of micro-operations at execute stage 16.
It will be appreciated that the particular types and numbers of pipeline stages shown are just one example and a wide variety of pipeline arrangements can be used. Again, for ease of understanding it is assumed that each pipeline stage is traversed in a single cycle by a given instruction or micro-operation (or by the address corresponding to a given instruction, in the case of the branch prediction stage P0 and at least an initial fetch stage F0), but this is not essential. Also, for ease of understanding it is assumed that all the operations of the loop body can be handled in a single micro-operation per iteration (not requiring decoding into multiple loop iterations as shown in FIG. 2). Again, this is not essential, and other examples may decode multiple micro-operations per loop iteration.

FIG. 10 shows an example where the branch predictor 40 predicted that the required number of iterations for the loop is 5 and so having supplied micro-operations for iterations 0-4, the subsequent instructions A-G which are to be executed after the loop are supplied. However, once the micro-operation for iteration 0 reaches execute stage E2, the actual number of iterations is resolved to be 6 and so it would be incorrect to execute instruction A next after the iteration, Iter4, is complete, since instruction A could be dependent on the outcome of the missing $6^{th}$ iteration, iter5. An insufficient number of loop iterations was supplied by the front-end circuitry 6, 10. Therefore, a flush is performed (in this case, after completing execution of the correct loop iterations Iter1-Iter4), and then the correct instruction stream (iters, A, B, C, etc.) starts to be fetched. In this example, having started the prediction for iteration 0 of the loop in cycle 0, the first instruction A after the loop is executed in cycle 27.

As shown in FIG. 11, which again considers an example where the predicted number of iterations was 5 but the actual number is 6, if the front-end circuitry 10, 12 had stopped supplying loop iterations after the first four iterations had been supplied, until the cycle 11 in which the actual number of iterations is resolved at execute stage E2, then no flush would be required because the subsequent instructions A-G after the loop had not been supplied yet and so the under-prediction of the number of loop iterations can be dealt with simply by resuming supply of the remaining loop iterations, iter4 and iter5, which are still to be supplied to the processing circuitry. Hence, while there are a number of cycles in which the processing circuitry (execute stage 16) has no micro-operations to process, nevertheless the overall performance is improved compared to FIG. 10 because instruction A is now finished at cycle 24 instead of cycle 27 as in FIG. 10.

While FIG. 11 shows use of a complete stall (zero supply rate), as shown in FIG. 12, a non-zero reduced supply rate can also be used. Again, after the first four iterations iter0-iter3 have been supplied, the supply rate is reduced to ⅓ of the maximum supply rate by supplying one further iteration every three cycles. In this example, once the supply rate has been reduced, subsequent iterations are supplied even if predicted not to be needed (e.g. the 6$^{th}$ iteration, iter5, is supplied even though the predicted number of iterations is 5). This is possible because the predication of the loop body means unnecessary iterations can be executed without adverse architectural effects. Again, this means that by the time the actual number of iterations is resolved at the execute stage 16, the subsequent instruction A after the loop has not yet been supplied and can now be supplied once the loop is resolved as being terminated. In this example, this allows a further improvement because instruction a complete execution in cycle 22 instead of cycle 24 as in FIG. 11.

The particular approach to use may depend on the level of confidence in the prediction. For confidently predictable instructions, the approach shown in FIG. 10 of simply supplying the predicted number of loop iterations at the maximum rate may tend to improve performance, by allowing those loop iterations to be processed fastest at the execute stage 16. The probability of flushes being required due to under-predicting the number of loop iterations be relatively low for those predictions with a confidence greater than a certain threshold.

Figure 14:
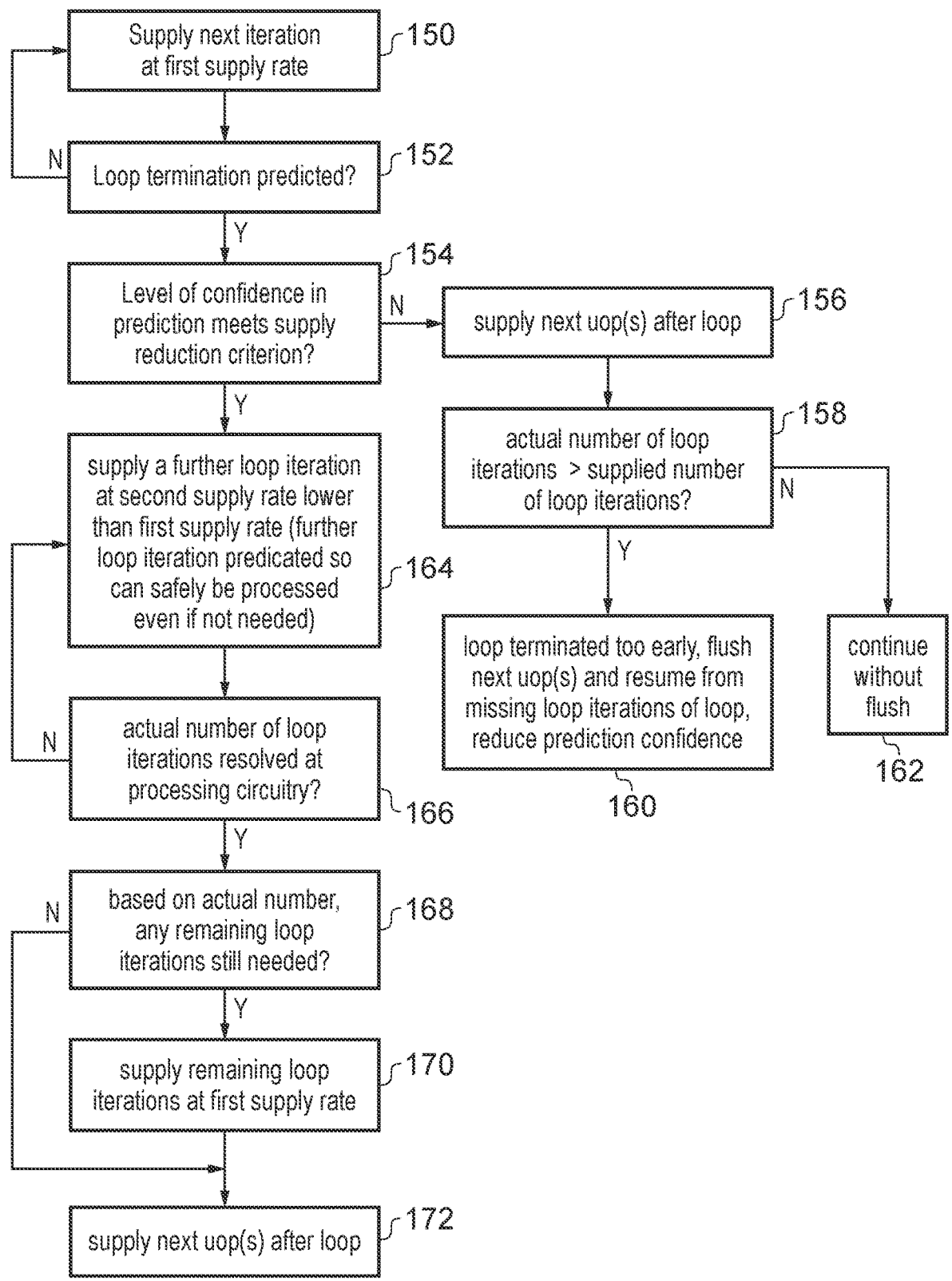
FIG. 14 is a flow diagram showing a first example method of controlling the supply rate.
Figure 15:
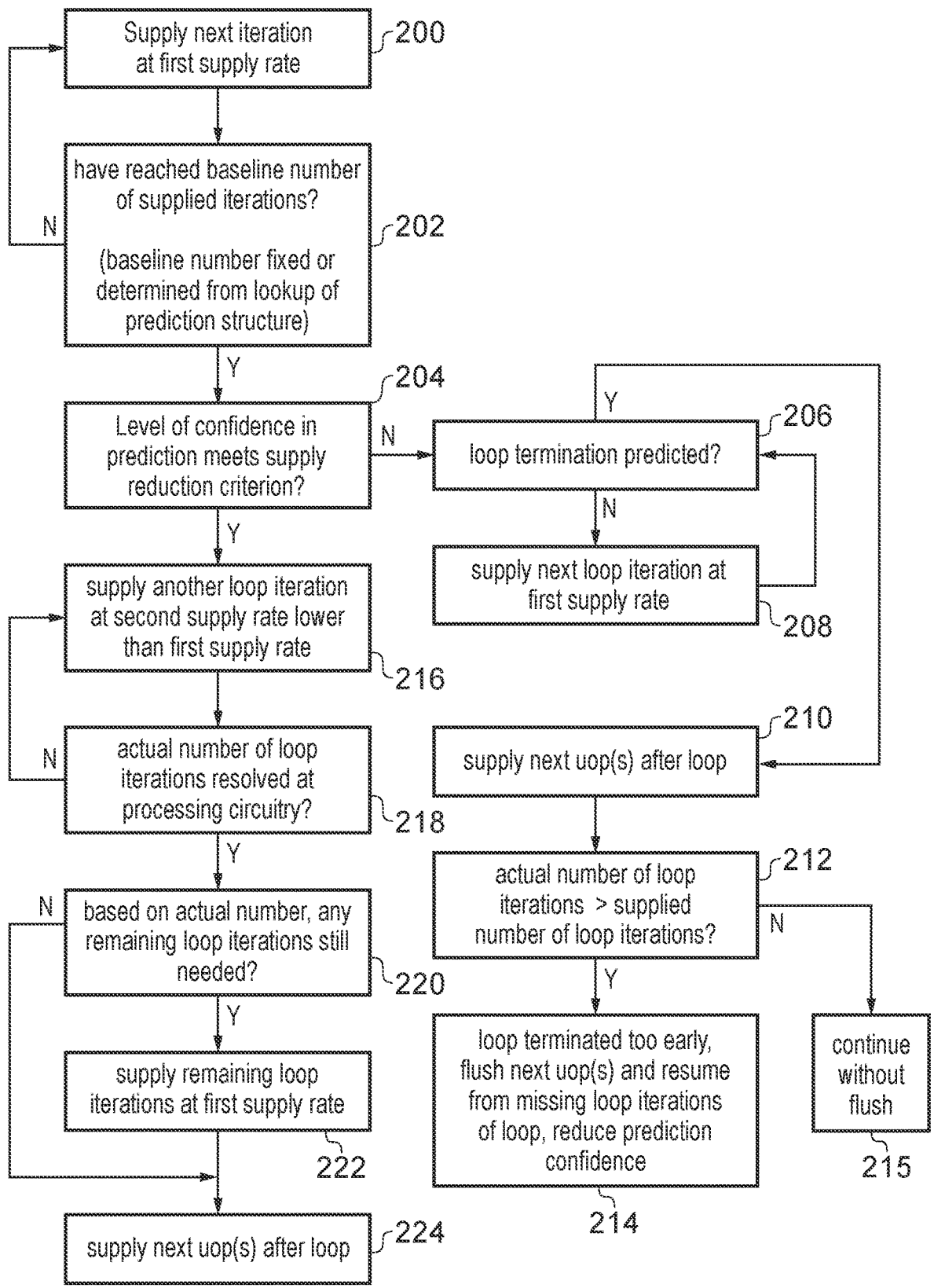
FIG. 15 is a flow diagram showing a second example method of controlling the supply rate.

For less confident predictions, a reduced supply rate may be chosen once a certain initial subset of loop iterations has been supplied. As shown in FIGS. 14 and 15 discussed below, the initial subset could be the predicted number of loop iterations (up to the point that the loop is predicted to be terminated) or could be a certain baseline number of loop iterations. It can be useful to supply the initial subset of loop iterations at a relatively high supply rate regardless of confidence in the prediction, because the probability of under-prediction is relatively low for the initial subset of loop iterations. Once the initial subset of loop iterations has been supplied, a supply rate for remaining loop iterations (or further loop iterations beyond the point at which the loop termination is predicted) can be chosen from several levels, e.g. 50% (supply 1 iteration every 2 cycles), 33% (supply 1 iteration every 3 cycles), and 0% (full stall until actual number of loop iterations resolved). Which supply rate is used can be chosen based on the level of confidence, with lower levels of confidence being associated with reduced supply rates in comparison to higher levels of confidence.

Note that FIG. 10 shows, as the comparative case with a flush, an example where the flush is not triggered until all the required iterations already supplied before the misprediction was detected have been executed. This is unlike the example of FIG. 6 where the flush can be triggered early without requiring all the intervening iterations to be executed first. While triggering an early flush could be another solution to the problem shown in FIG. 10, it may require the ability to be able to predict the number of micro-operations per iteration so that the flush point can be determined at a point of the pipeline other than the latest micro-operation reaching execution. For a loop where the number of micro-operations per iteration is not fixed, this may not be possible, so the technique of slowing down supply of micro-operations can be another technique for improving average case performance by reducing the risk of the flush being needed in the first place. In any case, even if the flush can be triggered early, due to the depth of the pipeline, it may take a large number of cycles for instructions fetched after the flush to reach the execute stage, so even if the early flush technique shown in FIG. 6 (not used in the example of FIG. 10) was applied to the pipeline of FIG. 10, on some occasions (depending on the point at which the loop is predicted to terminate) reducing the supply rate can still help to improve performance compared to triggering a flush.

Figure 13:
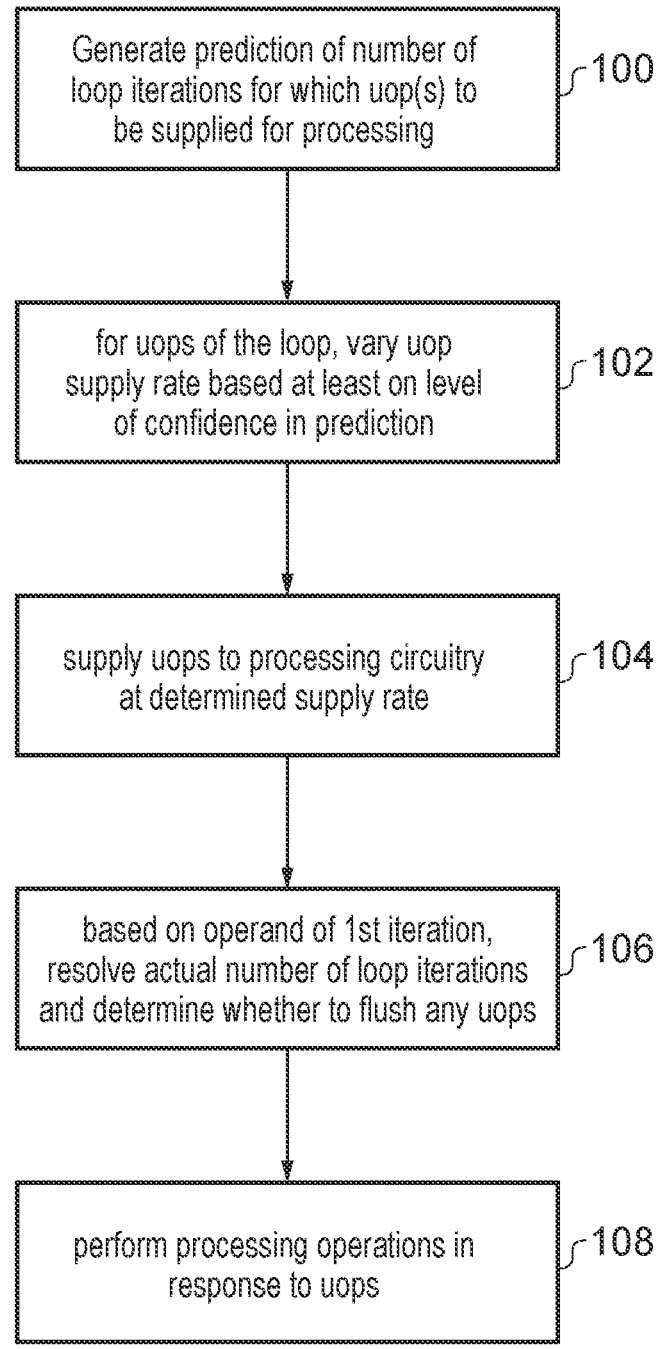
FIG. 13 is a flow diagram showing a method including varying micro-operation supply rate based on prediction confidence associated with a prediction of the number of loop iterations.

FIG. 13 is a flow diagram showing a method of controlling processing of loop iterations. At step 100 the branch predictor 40 generates a prediction of the number of loop iterations for which the front end circuitry 6, 10 is to supply micro-operations (cops) for processing by the processing circuitry 16. At step 102, for the micro-operations of the loop, the front-end circuitry 6, 10 varies the micro-operation supply rate based at least on the level of confidence in the prediction made by the branch predictor 40. At step 104, the front-end circuitry 6, 10 supplies the micro-operations to the processing circuitry at the determined supply rate. At step 106, based on an operand associated with the first iteration of the loop, the processing circuitry 16 resolves the actual number of loop iterations and determines whether to flush any micro-operations from the pipeline. At step 108, the processing circuitry performs any processing operations required for the non-flushed micro-operations. It will be appreciated that while FIG. 13 shows a sequential flow chart, as these operations are performed in pipeline, different stages of the pipeline may process different steps of FIG. 13 in a pipelined manner while processing different instructions (e.g. with a Later pipeline stage handling an operation for a micro-operation corresponding to a first instruction in parallel with an earlier pipeline stage handling a micro-operation corresponding to a second instruction).

FIG. 14 is a flow diagram showing in more detail a method of controlling the supply rate for supplying the micro-operations for the loop, in a first example in which the initial portion of iterations (for which micro-operations are supplied at a rate independent of the level of confidence) comprises the predicted number of loop iterations up to the loop termination point.

At step 150, the front-end circuitry 6, 10 supplies the next iteration of one or more micro-operations for the loop, using a first supply rate which is independent of prediction confidence. At step 152, the branch predictor 40 or the front-end circuitry 6, 10 determines whether loop termination has been predicted yet. If not, then the next iteration of the loop continues to be supplied at the first supply rate at step 150.

Once loop termination is predicted, then at step 154, the production circuitry 40 determines whether a level of confidence in the prediction of the number of loop iterations meets a supply reduction criterion. For example, this could be based on whether a prediction confidence indicator associated with the prediction of the number of loop iterations indicates a level of confidence lower than a certain confidence threshold. Alternatively, there could be a dedicated "hard-to-predict" flag or other indicator associated with prediction state information, which indicates whether the prediction is considered a "hard-to-predict" prediction which encountered a number of mispredictions in the past, and so a prediction could meet the supply reduction criterion if the "hard-to-predict" indicator is set to a certain value.

If the level of confidence in the prediction does not meet the supply reduction criterion, then at step 156 the branch predictor 40 controls the front-end circuitry 6, 10 to supply the next micro-operation to be processed after the loop (e.g. instructions C, D in the example of FIG. 2 or A, B, C, D, etc. in the examples of FIGS. 10-12). When the prediction is a relatively confident prediction than there is no need to reduce the supply rate or to supply additional loop iterations speculatively. At step 158, once the processing circuitry 16 has resolved the actual number of loop iterations, the branch misprediction detection circuitry 46 (which could in some examples also be considered part of the prediction circuitry 40) determines whether the actual number of loop iterations is greater than the supplied number of loop iterations, so that an under-prediction of the number of loop iterations occurred. If so, then at step 160 determined that the loop was terminated too early, and so the next micro-operations supplied at step 156 are flushed from the pipeline, and fetching resumes from any missing loop iterations still to be supplied. The prediction confidence indicator associated with this prediction can be updated to indicate a reduced level of confidence. On the other hand, if at step 158 it was determined that the actual number of loop iterations is equal to or less than the supplied number of loop iterations, then at step 162 processing can continue without a flush. Even if an over-prediction occurred, there is no need for a flush because the predication of the loop body micro-operations means that no adverse architectural effect occurs.

If at step 154, it is determined that the level of confidence in the prediction meets the supply reduction criterion, then at step 164 the prediction circuitry 40 controls the front-end circuitry 6, 10 to supply a further loop iteration at a second supply rate lower than the first supply rate used at step 150. This further loop iteration is a predicated loop iteration so can safely be processed without adverse architectural effect even if it turns out to be an unnecessary loop iteration once the actual number of loop iterations is resolved. The second supply rate selected at step 164 could be zero (full stall) or non-zero, and could be selected, based on the level of confidence in the prediction, from one or more different levels lower than the first supply rate. If the selected supply rate is zero, no further loop iterations will be supplied until the actual number of loop iterations is resolved.

At step 166, it is determined whether the actual number of loop iterations has been resolved by the processing circuitry 16. If not, then at step 164, the front-end circuitry continues to supply further loop iterations at intervals of time, where the interval between supply of successive loop iterations corresponds to the second supply rate (longer interval for slower supply rate, shorter interval for faster supply rate).

Once the actual number of loop iterations has been resolved, at step 168 the prediction circuitry 40 determines, based on the actual number of loop iterations, whether any remaining loop iterations are still needed. If so, then at step 170 any remaining loop iterations can be supplied at the first supply rate (e.g. the maximum supply rate supported), as this is now definitely known based on the operands of the first loop iteration. If the actual number of loop iterations is equal to or less than the number of loop iterations supplied already before the point at which the actual number is resolved, then there is no need to supply any further loop iterations, and so step 170 can be omitted. Once all required loop iterations have been supplied, at step 172 the next micro-operations after the loop are supplied. The prediction circuitry 40 can also update the prediction confidence based on the outcome of the prediction (e.g. boosting confidence if a correct prediction was made, or reducing confidence if the prediction was incorrect).

Hence, in the example of FIG. 14, the first supply rate is used up to the point when the predicated-loop-terminating-branch instruction is predicted not taken, and after that further iterations are supplied at a slower rate (even though not predicted to be needed), and those further iterations continue to be supplied until the actual number of iterations is resolved. As shown in FIG. 12, for some less confident predictions prone to under-predictions, this can improve performance in comparison to a flush being required when micro-operations are supplied at a faster rate as shown in FIG. 10.

FIG. 15 is a flow diagram showing a second example of controlling the supply rate, where the initial number of iterations supplied at the first supply rate is a baseline number of iterations. At step 200, the next iteration required (prior to reaching the baseline number of iterations) is supplied at the first supply rate. At step 202, the branch predictor 40 detects whether the supplied number of iterations has yet reached the baseline number. The baseline number of iterations could be fixed in hardware, or could be variable and determined from a lookup of a prediction structure. The baseline number can be a certain minimum number of iterations predicted to be required for the loop, so that it is relatively unlikely that an under-prediction of the number of loop iterations will arise that would require flushing of any of the baseline number of loop iterations. If this is looked up from a prediction structure, the minimum number of iterations can be trained based on past attempts at executing the loop. If, at step 202, the supplied number of iterations has not yet reached the baseline number, then the method continues looping through steps 200 and 202 until the baseline number of iterations has been supplied.

Once the baseline number of iterations has been supplied, then at step 204 the branch predictor 40 determines whether a level of confidence in the prediction meets the supply reduction criterion, which could be evaluated in the same way as described for step 154 of FIG. 14. If the level of confidence in the prediction does not meet the supply reduction criterion, then at step 206 the branch predictor determines whether loop termination has yet been predicted and if not then at step 208 controls the front-end circuitry 6, 10 to supply the next loop iteration at the first supply rate. Supply of further loop iterations continues at the first supply rate until the loop termination is predicted, at which point at step 210 the next micro-operations after the loop are supplied. Once the actual number of loop iterations has been resolved by the processing circuitry 16, steps 212, 214, 215 determine whether a flush is required, in the same way as shown at steps 158, 160, 162 of FIG. 14.

If at step 204 the level of confidence in the prediction does meet the supply reduction criterion, then at step 216 another loop iteration is supplied at a second supply rate lower than the first supply rate. Again, the particular supply rate to be used as the second supply rate may vary based on confidence. At step 218 the branch prediction circuitry 40 determines whether the actual number of loop iterations has yet been resolved at the processing circuitry and if not continues to supply another loop iteration at the second supply rate lower than the first supply rate. This other loop iteration could be a loop iteration predicted to be required (if the predicted number of iterations has not yet been reached) or could be a loop iteration predicted to be unnecessary (for less confident predictions, the branch predictor 40 can control the front-end circuitry 6, 10 to continue supplying micro-operations until the actual number of loop iterations is resolved). Otherwise, steps 216, 218, 220, 222, 224 function in the same way as corresponding steps 164, 166, 168, 170, 172 of FIG. 14.

Figure 16:
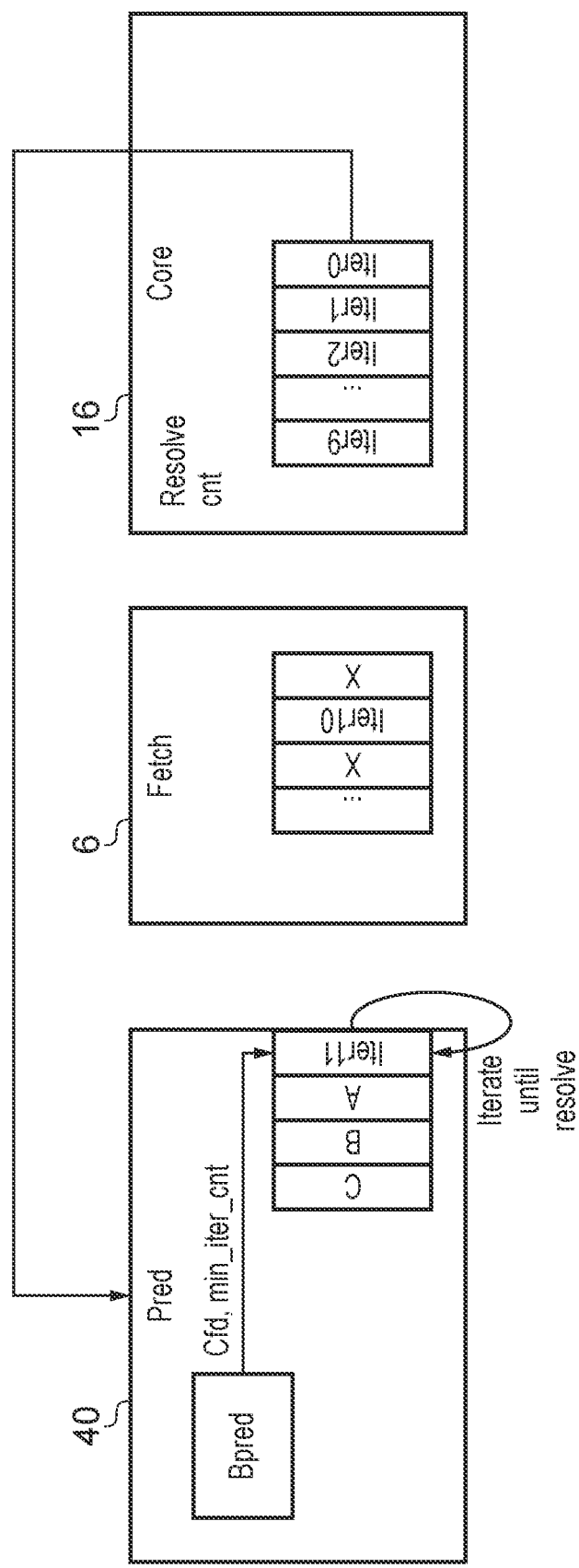
FIG. 16 illustrates an example implementation where the loop iterations are executed in supply order.

FIG. 16 illustrates a simplified pipeline example (showing only the prediction stage 40, fetch stage 6 and execute stage 16 for conciseness, although other stages may still be provided). In this example, the execute stage 16 (processing circuitry) supports in-order execution of the loop iterations in the supply order corresponding to the order in which they are supplied by the fetch stage 6. For example, the loop iterations may be processed in ascending or descending order of the addresses of the portions of memory to be copied, in the menicpy example. In this implementation, the prediction circuitry 40 slows down or stops sending further iterations when detecting a low-confidence prediction, which can be detected from information stored in the prediction state information indicating the hard to predict cases. After a certain baseline number of iterations are sent through the pipeline (the baseline number indicated by a minimal-iteration-count parameter, min_iter_cnt, stored in the prediction state information), or after supplying the predicted number of iterations up to the not-taken prediction (loop termination prediction), the prediction circuitry 40 controls the fetch stage 6 to use a reduced supply rate for remaining iterations, and continues to supply further iterations until the loop iteration count is resolved by the execute stage 16. In this example, no information on back end processing resource is considered for the purpose of selecting the rate at which the micro-operations for the loop are supplied by the front end circuitry 6, 10.

Figure 17:
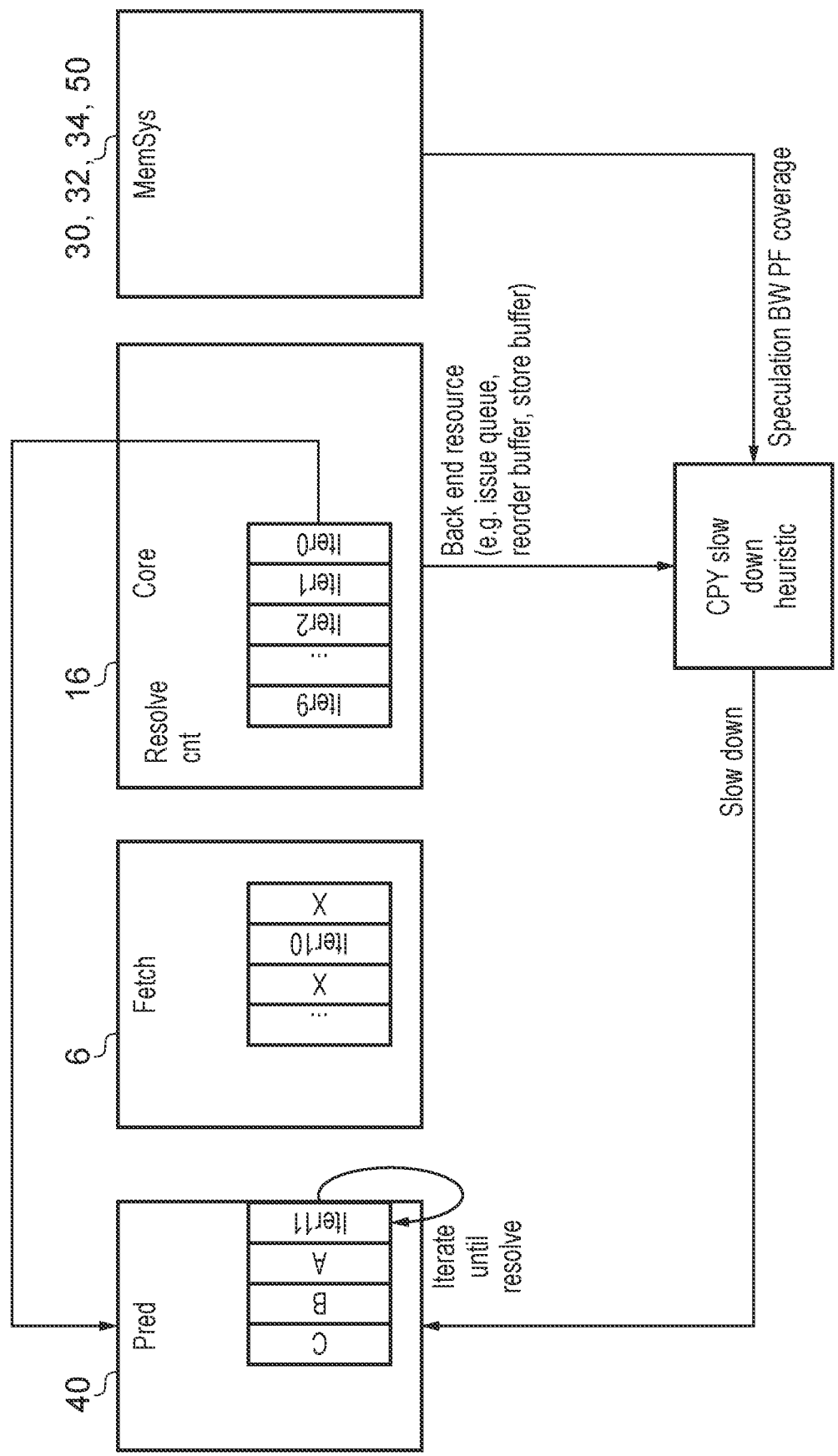
FIG. 17 illustrates an example implementation where out-of-order execution of the loop iterations in a different order to the supply order is supported.

FIG. 17 shows a second example in which back-end resource utilisation information is considered by the front-end circuitry in controlling the supply rate. In this example, one or more indications of resource utilisation at various back-end resources is gathered, indicating how much spare capacity is available at various structures such as the issue queue 13, reorder buffer 19, store buffer 27, and internal queues in the prefetcher 50 available for prefetch requests. A slowdown heuristic can be implemented which combines this information to produce a slowdown indication indicating the amount of slowdown requested. This slowdown indication can be combined with a level of confidence in the prediction to determine the supply rate to be used for iterations of the loop. For less confident predictions, the supply rate can be varied in the same way as discussed in the examples above. In this example, for more confident predictions, the supply rate could be varied if there is insufficient back-end processing resource available for processing iterations. This avoids risking supply of too many loop iterations requiring a flush it on a misprediction in cases when those additional loop iterations would not be processed soon anyway due to the constraints on back end processing resource.

It will be appreciated that a range of information can be used to choose the slow down level. Some examples (not exhaustive, and which do not all need to be used) are as follows:

Available entries in structures (i.e. Issue queues, PCRF, Store Buffer, etc.)

Prefetch needs (e.g. whether addresses to be accessed by the loop body can be handled by a prefetcher)

Criticality in terms of latency: how close to the commit point of the reorder buffer the loop body micro-operations will be when executed.

The heuristics for tracking this information could be implemented as a simple counter based on static or dynamic thresholds, or based on a prediction structure (e.g. a perceptron predictor) with information from the various sources of back end information and a feedback on whether it was useful or not to slow down the rate for a given set of back end resource utilisation information.

Code for Fabrication

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Further examples are provided in the following clauses:

1. An apparatus comprising:
   processing circuitry to perform processing operations in response to micro-operations;
   front end circuitry to supply the micro-operations to be processed by the processing circuitry; and
   prediction circuitry to generate a prediction of a number of loop iterations for which one or more micro-operations per loop iteration are to be supplied by the front end circuitry, where an actual number of loop iterations to be processed by the processing circuitry is resolvable by the processing circuitry based on at least one operand corresponding to a first loop iteration to be processed by the processing circuitry; in which:
   the front end circuitry is configured to vary, based on a level of confidence in the prediction of the number of loop iterations, a supply rate with which the one or more micro-operations for at least a subset of the loop iterations are supplied to the processing circuitry.

2. The apparatus according to clause 1, in which, for supplying the one or more micro-operations for at least the subset of the loop iterations, the front end circuitry is configured to select a lower supply rate for a less-confident prediction of the number of loop iterations than for a more-confident prediction of the number of loop iterations.

3. The apparatus according to any of clauses 1 and 2, in which for supplying the one or more micro-operations for at least the subset of the loop iterations, the front end circuitry is configured to select between at least three different supply rates based on the level of confidence.

4. The apparatus according to any of clauses 1 to 3, in which, for a prediction where the level of confidence meets a supply rate reduction criterion, the front end circuitry is configured to:
   supply the one or more micro-operations for an initial subset of loop iterations at a first supply rate; and
   supply the one or more micro-operations for a further subset of loop iterations at a second supply rate lower than the first supply rate.

5. The apparatus according to clause 4, in which:
   the one or more micro-operations comprise one or more predicated micro-operations for which, if at least one unnecessary iteration of the one or more micro-operations is processed by the processing circuitry following an over-prediction of the number of loop iterations, processing of the at least one unnecessary iteration is predicated to suppress any architectural effect of the unnecessary iteration of the one or more micro-operations;
   the initial subset of loop iterations comprises the number of loop iterations predicted by the prediction circuitry; and
   the further subset of loop iterations comprises at least one further loop iteration supplied to the processing circuitry at the second supply rate despite being predicted not to be required for processing by the processing circuitry.

6. The apparatus according to clause 4, in which the initial subset of loop iterations comprises a baseline number of loop iterations which is independent of the number of loop iterations predicted by the prediction circuitry to be required for processing by the processing circuitry.

7. The apparatus according to clause 6, in which the baseline number of loop iterations is a fixed number.

8. The apparatus according to clause 6, in which the prediction circuitry is configured to determine the baseline number of loop iterations based on a lookup of a baseline-iteration number-defining parameter of a prediction data structure, where the baseline-iteration-number-defining parameter is separate from a prediction parameter used to determine the number of loop iterations predicted by the prediction circuitry to be required for processing by the processing circuitry.

9. The apparatus according any of clauses 1 to 8, in which:
   in response to a determination that, after the front end circuitry has determined to supply the one or more micro-operations for the subset of the loop iterations at a lower supply rate, the processing circuitry has resolved the actual number of loop iterations and there is still at least one remaining iteration for which the one or more micro-operations are not yet obtained or generated for supply to the processing circuitry, the front end circuitry is configured to supply the one or more micro-operations for the at least one remaining iteration at a higher supply rate than the lower supply rate.

10. The apparatus according to any of clauses 1 to 9, in which the processing circuitry is capable of executing the loop iterations out-of-order; and
    the front end circuitry is also configured to vary the supply rate based on resource utilisation information indicative of utilisation of back-end processing resource associated with the processing circuitry.

11. The apparatus according to clause 10, in which the back-end processing resource comprises at least one of:
    a store buffer to buffer pending store requests;
    prefetch circuitry to prefetch data to a cache;
    an issue queue to queue micro-operations supplied by the front end circuitry before the micro-operations are issued to the processing circuitry; and
    a reorder buffer to track in-order commitment of out-of-order executed instructions.

12. The apparatus according to any of clauses 1 to 11, in which the prediction circuitry is configured to generate the prediction of the number of loop iterations in response to detecting program flow reaching, or being predicted to reach, an address predicted as corresponding to a loop-terminating branch instruction for controlling, based on whether a loop termination condition is satisfied, whether the processing circuitry should process a further iteration of a loop body or process a following instruction to be processed after a final iteration of the loop body.

13. The apparatus according to clause 12, in which the loop body comprises operations to:
   determine a variable number of bytes to be processed in a current iteration;
   perform at least one processing operation based on the variable number of bytes determined for the current iteration, the at least one processing operation including at least one of a load operation and a store operation; and
   update, based on the variable number of bytes, a remaining bytes parameter indicative of a remaining number of bytes to be processed.

14. The apparatus according to clause 13, in which the loop termination condition for a given iteration of the loop-terminating branch instruction is satisfied when the remaining bytes parameter indicates that the number of remaining bytes to be processed is zero.

15. The apparatus according to any of clauses 13 and 14, in which the variable number of bytes to be processed in the current iteration is dependent on alignment of a target address of said at least one of the load operation and the store operation with respect to an alignment boundary.

16. The apparatus according to any of clauses 12 to 15, in which the loop-terminating branch instruction is a combined instruction for controlling the processing circuitry to perform both the loop body and a conditional branch operation conditional on whether the loop termination condition is satisfied.

17. The apparatus according to any of clauses 12 to 15, in which the loop-terminating branch instruction is separate from one or more instructions for controlling the processing circuitry to perform the loop body.

18. The apparatus according to any of clauses 1 to 17, in which the one or more micro-operations comprise one or more micro-operations to control the processing circuitry to perform a memory copy operation to copy data from a first memory region to a second memory region.

19. A method comprising:
   supplying, with front end circuitry, micro-operations to be processed by processing circuitry; and
   performing, with the processing circuitry, processing operations in response to the micro-operations;
   generating a prediction of a number of loop iterations for which one or more micro-operations per loop iteration are to be supplied by the front end circuitry, where an actual number of loop iterations to be processed by the processing circuitry is resolvable by the processing circuitry based on at least one operand corresponding to a first loop iteration to be processed by the processing circuitry; and:
   varying, based on a level of confidence in the prediction of the number of loop iterations, a supply rate with which the one or more micro-operations for at least a subset of the loop iterations are supplied to the processing circuitry by the front end circuitry.

20. A computer-readable medium to store computer-readable code for fabrication of an apparatus comprising:
   processing circuitry to perform processing operations in response to micro-operations;
   front end circuitry to supply the micro-operations to be processed by the processing circuitry; and
   prediction circuitry to generate a prediction of a number of loop iterations for which one or more micro-operations per loop iteration are to be supplied by the front end circuitry, where an actual number of loop iterations to be processed by the processing circuitry is resolvable by the processing circuitry based on at least one operand corresponding to a first loop iteration to be processed by the processing circuitry; in which:
   the front end circuitry is configured to vary, based on a level of confidence in the prediction of the number of loop iterations, a supply rate with which the one or more micro-operations for at least a subset of the loop iterations are supplied to the processing circuitry.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
   processing circuitry to perform processing operations in response to micro-operations;
   front end circuitry to supply the micro-operations to be processed by the processing circuitry; and
   prediction circuitry to generate a prediction of a number of loop iterations for which one or more micro-operations per loop iteration are to be supplied by the front end circuitry, where an actual number of the loop iterations to be processed by the processing circuitry is resolvable by the processing circuitry based on at least one operand corresponding to a first loop iteration to be processed by the processing circuitry; in which:
   the front end circuitry is configured to vary, based on a level of confidence in the prediction of the number of the loop iterations, a supply rate with which the one or more micro-operations for at least a subset of the loop iterations are supplied to the processing circuitry;
   the prediction circuitry is configured to generate the prediction of the number of the loop iterations in response to detecting program flow reaching, or being predicted to reach, an address predicted as corresponding to a loop-terminating branch instruction for controlling, based on whether a loop termination condition is satisfied, whether the processing circuitry should process a further iteration of a loop body or process a following instruction to be processed after a final iteration of the loop body; and the loop body comprises operations to:
determine a variable number of bytes to be processed in a current iteration;
perform at least one processing operation based on the variable number of bytes determined for the current iteration, the at least one processing operation including at least one of a load operation and a store operation; and
update, based on the variable number of bytes, a remaining bytes parameter indicative of a remaining number of bytes to be processed.

2. The apparatus according to claim 1, in which, for supplying the one or more micro-operations for at least the subset of the loop iterations, the front end circuitry is configured to select a lower supply rate for a less-confident prediction of the number of the loop iterations than for a more-confident prediction of the number of the loop iterations.

3. The apparatus according to claim 1, in which for supplying the one or more micro-operations for at least the subset of the loop iterations, the front end circuitry is configured to select between at least three different supply rates based on the level of confidence.

4. The apparatus according to claim 1, in which, for a prediction where the level of confidence meets a supply rate reduction criterion, the front end circuitry is configured to:
supply the one or more micro-operations for an initial subset of the loop iterations at a first supply rate; and
supply the one or more micro-operations for a further subset of the loop iterations at a second supply rate lower than the first supply rate.

5. The apparatus according to claim 4, in which the initial subset of the loop iterations comprises a baseline number of the loop iterations which is independent of the number of the loop iterations predicted by the prediction circuitry to be required for processing by the processing circuitry.

6. The apparatus according to claim 5, in which the baseline number of the loop iterations is a fixed number.

7. The apparatus according to claim 5, in which the prediction circuitry is configured to determine the baseline number of the loop iterations based on a lookup of a baseline-iteration number-defining parameter of a prediction data structure, where the baseline-iteration-number-defining parameter is separate from a prediction parameter used to determine the number of the loop iterations predicted by the prediction circuitry to be required for processing by the processing circuitry.

8. The apparatus according to claim 1, in which the processing circuitry is capable of executing the loop iterations out-of-order; and
the front end circuitry is also configured to vary the supply rate based on resource utilisation information indicative of utilisation of back-end processing resource associated with the processing circuitry.

9. The apparatus according to claim 8, in which the back-end processing resource comprises at least one of:
a store buffer to buffer pending store requests;
prefetch circuitry to prefetch data to a cache;
an issue queue to queue the one or more micro-operations supplied by the front end circuitry before the micro-operations are issued to the processing circuitry; and
a reorder buffer to track in-order commitment of out-of-order executed instructions.

10. The apparatus according to claim 1, in which the loop termination condition for a given iteration of the loop-terminating branch instruction is satisfied when the remaining bytes parameter indicates that the number of remaining bytes to be processed is zero.

11. The apparatus according to claim 1, in which the variable number of bytes to be processed in the current iteration is dependent on alignment of a target address of said at least one of the load operation and the store operation with respect to an alignment boundary.

12. The apparatus according to claim 1, in which the loop-terminating branch instruction is a combined instruction for controlling the processing circuitry to perform both the loop body and a conditional branch operation conditional on whether the loop termination condition is satisfied.

13. The apparatus according to claim 1, in which the loop-terminating branch instruction is separate from one or more instructions for controlling the processing circuitry to perform the loop body.

14. The apparatus according to claim 1, in which the one or more micro-operations comprise one or more micro-operations to control the processing circuitry to perform a memory copy operation to copy data from a first memory region to a second memory region.

15. A non-transitory computer-readable medium to store computer-readable code for fabrication of the apparatus according to claim 1.

16. An apparatus comprising:
processing circuitry to perform processing operations in response to micro-operations;
front end circuitry to supply the micro-operations to be processed by the processing circuitry; and
prediction circuitry to generate a prediction of a number of loop iterations for which one or more micro-operations per loop iteration are to be supplied by the front end circuitry, where an actual number of the loop iterations to be processed by the processing circuitry is resolvable by the processing circuitry based on at least one operand corresponding to a first loop iteration to be processed by the processing circuitry; in which:
the front end circuitry is configured to vary, based on a level of confidence in the prediction of the number of the loop iterations, a supply rate with which the one or more micro-operations for at least a subset of the loop iterations are supplied to the processing circuitry;
in which for a prediction where the level of confidence meets a supply rate reduction criterion, the front end circuitry is configured to:
supply the one or more micro-operations for an initial subset of the loop iterations at a first supply rate; and
supply the one or more micro-operations for a further subset of the loop iterations at a second supply rate lower than the first supply rate; in which:
the one or more micro-operations comprise one or more predicated micro-operations for which, if at least one unnecessary iteration of the one or more micro-operations is processed by the processing circuitry following an over-prediction of the number of the loop iterations, processing of the at least one unnecessary iteration is predicated to suppress any architectural effect of the unnecessary iteration of the one or more micro-operations;
the initial subset of the loop iterations comprises the number of the loop iterations predicted by the prediction circuitry; and
the further subset of the loop iterations comprises at least one further loop iteration supplied to the processing circuitry at the second supply rate despite being predicted not to be required for processing by the processing circuitry.

17. An apparatus comprising:

processing circuitry to perform processing operations in response to micro-operations;

front end circuitry to supply the micro-operations to be processed by the processing circuitry; and prediction circuitry to generate a prediction of a number of loop iterations for which one or more micro-operations per loop iteration are to be supplied by the front end circuitry, where an actual number of the loop iterations to be processed by the processing circuitry is resolvable by the processing circuitry based on at least one operand corresponding to a first loop iteration to be processed by the processing circuitry; in which:

the front end circuitry is configured to vary, based on a level of confidence in the prediction of the number of the loop iterations, a supply rate with which the one or more micro-operations for at least a subset of the loop iterations are supplied to the processing circuitry; and in response to a determination that, after the front end circuitry has determined to supply the one or more micro-operations for the subset of the loop iterations at a lower supply rate, the processing circuitry has resolved the actual number of the loop iterations and there is still at least one remaining iteration for which the one or more micro-operations are not yet obtained or generated for supply to the processing circuitry, the front end circuitry is configured to supply the one or more micro-operations for the at least one remaining iteration at a higher supply rate than the lower supply rate.

* * * * *